(12) United States Patent
Al-Muslim et al.

(10) Patent No.: US 11,473,275 B2
(45) Date of Patent: Oct. 18, 2022

(54) PIPELINE PRESSURE TESTING ACCOUNTING FOR MEASUREMENT UNCERTAINTIES

(71) Applicant: Saudi Arabian Oil Company, Dhahran (SA)

(72) Inventors: Husain M. Al-Muslim, Dammam (SA); Mansour M. Al-Saleh, Al-Hassa (SA); Hani A. Al-Subaikhy, Qatif (SA)

(73) Assignee: Saudi Arabian Oil Company, Dhahran (SA)

( * ) Notice: Subject to any disclaimer, the term of this patent is extended or adjusted under 35 U.S.C. 154(b) by 283 days.

(21) Appl. No.: 16/889,455

(22) Filed: Jun. 1, 2020

(65) Prior Publication Data

US 2021/0372094 A1 Dec. 2, 2021

(51) Int. Cl.
*G01M 3/28* (2006.01)
*E03B 7/07* (2006.01)
(Continued)

(52) U.S. Cl.
CPC ........... *E03B 7/075* (2013.01); *G01M 3/2815* (2013.01); *E03B 11/02* (2013.01); *E03B 11/10* (2013.01);
(Continued)

(58) Field of Classification Search
CPC ... F16L 2201/30; F16L 2201/60; G01M 3/28; G01M 3/2815
(Continued)

(56) References Cited

U.S. PATENT DOCUMENTS

| 5,201,212 A | 4/1993 | Williams |
| 5,850,037 A | 12/1998 | Mullins |

(Continued)

FOREIGN PATENT DOCUMENTS

| CN | 109163855 | 1/2019 |
| CN | 109163981 | 1/2019 |
| CN | 110553152 | 12/2019 |

OTHER PUBLICATIONS

PCT International Search Report and Written Opinion in International Appln. No. PCT/US2021/034849, dated Oct. 13, 2021, 16 pages.

(Continued)

*Primary Examiner* — Patrick F Brinson
(74) *Attorney, Agent, or Firm* — Fish & Richardson P.C.

(57) ABSTRACT

A pipeline pressure test that accounts for measurement uncertainties includes a method for performing a pressure test of a pipe section of a pipeline including receiving a desired pressure to be applied to the pipe section and a duration of time the desired pressure is to be applied to the pipe section, receiving a pressure measurement of a fluid, a temperature measurement of the fluid, a volume measurement of the fluid, and a pipe section strain measurement, determining a change in fluid pressure and a volume change, determining a pressure change uncertainty and a volume change uncertainty, checking that the pressure change uncertainty is within a pressure uncertainty threshold and that the volume change uncertainty is within a volume uncertainty threshold, determining whether the desired pressure has been applied to the inner surface of the pipe section for the duration of time; and outputting a result of the testing.

18 Claims, 12 Drawing Sheets

FIG. 3B

(51) Int. Cl.
    *E03B 11/02*     (2006.01)
    *E03B 11/10*     (2006.01)
    *F16L 1/028*     (2006.01)

(52) U.S. Cl.
    CPC ........... *F16L 1/028* (2013.01); *F16L 2201/30* (2013.01); *F16L 2201/60* (2013.01); *G01M 3/28* (2013.01)

(58) Field of Classification Search
    USPC ............ 138/104; 73/861.08, 861.42, 861.44; 702/50, 51, 85
    See application file for complete search history.

(56) References Cited

U.S. PATENT DOCUMENTS

| | | | |
|---|---|---|---|
| 6,691,584 B2 * | 2/2004 | Gysling | G01F 1/712 73/861.42 |
| 7,066,010 B2 | 6/2006 | Bryant et al. | |
| 7,475,591 B2 | 1/2009 | Buckley et al. | |
| 7,503,227 B2 * | 3/2009 | Davis | G01F 1/66 73/861.42 |
| 8,256,270 B2 | 9/2012 | Fielding et al. | |
| 8,746,079 B2 * | 6/2014 | Neumann | G01F 1/86 73/861.44 |
| 2007/0213949 A1 * | 9/2007 | Artiuch | G01F 1/05 73/1.16 |
| 2011/0301881 A1 * | 12/2011 | Danzy | G01D 21/02 702/50 |
| 2013/0110417 A1 | 5/2013 | Balogh et al. | |
| 2017/0372196 A1 | 12/2017 | Traidia et al. | |

OTHER PUBLICATIONS

Al-Muslim, Husain; Qutub, Amro "Develop Acceptance Criteria of Pressure Test of Buried Pipeline Using Uncertainty Analysis" Journal of Pressure Vessel Technology, 2011, 133(1): 011704-1-011704-8, 13 pages.

American Petroleum Institute, "Recommended Practice for the Pressure Testing of Steel Pipelines for the Transportation of Gas, Petroleum Gas, Hazardous Liquids, Highly Volatile Liquids, or Carbon Dioxide," API RP 1110, 6th edition, Februaty 2013, re-affirmed Aug. 2018, 3 pages.

Australian Standard. Pipelines—Gas and liquid petroleum, Part 5: Field Pressure Testing, "Appendix C: Pressure-Volume-Temperature Relationships in Pipeline Test Sections (Normative)," AS 2885.5:2012, 2012, pp. 62-67, 6 pages.

Bahadori et al., "Prediction of bulk modulus and volumetric expansion coefficient of water for leak tightness test of pipelines," International Journal of Pressure Vessels and Piping, 2009, 86: 550-554.

Moffat, R. J. "Contribution to the Theory of Single-Sample Uncertainty Analysis" Journal of Fluids Engineering. vol. 104, 1982, pp. 250-260, 9 pages.

\* cited by examiner

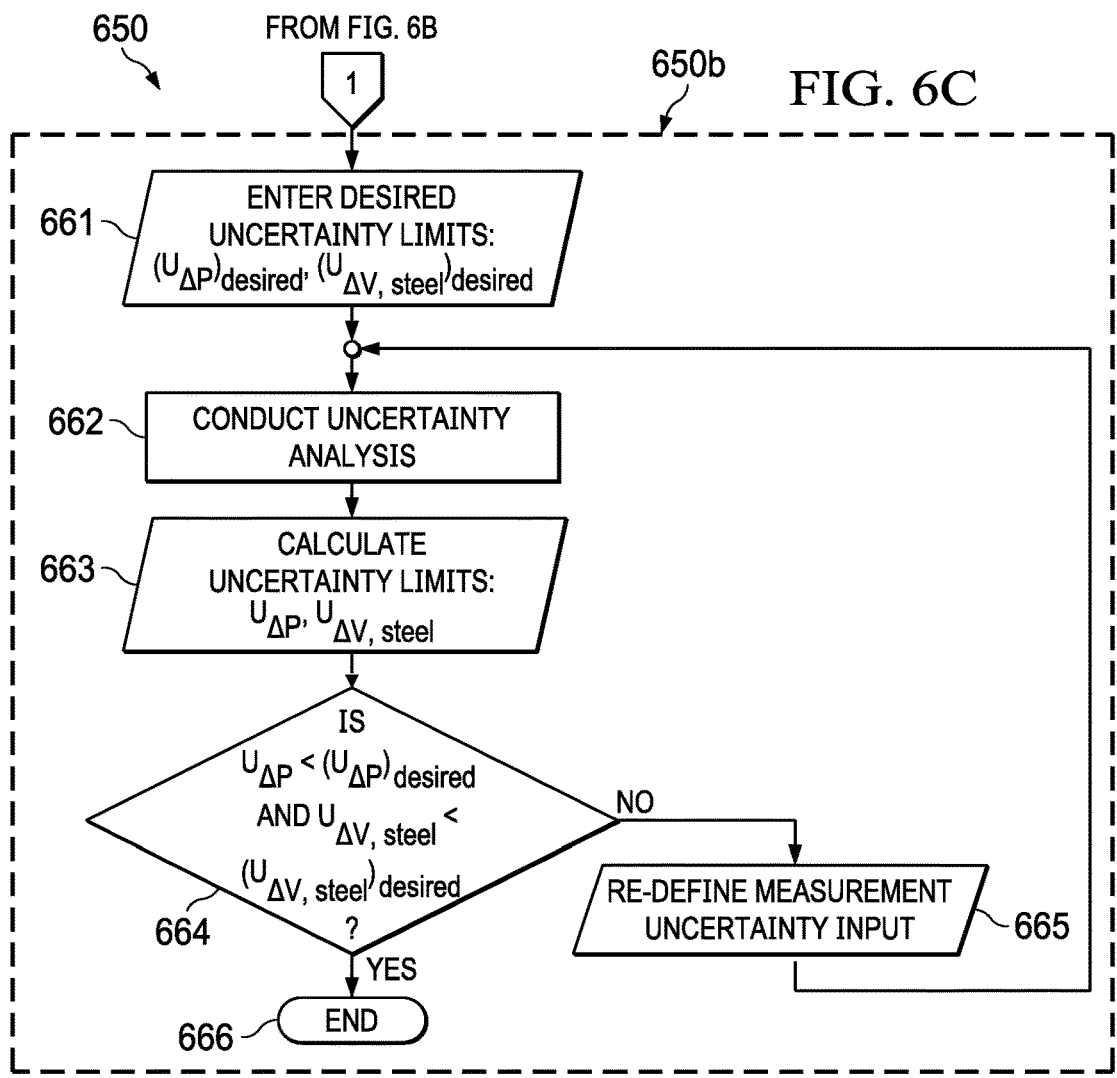
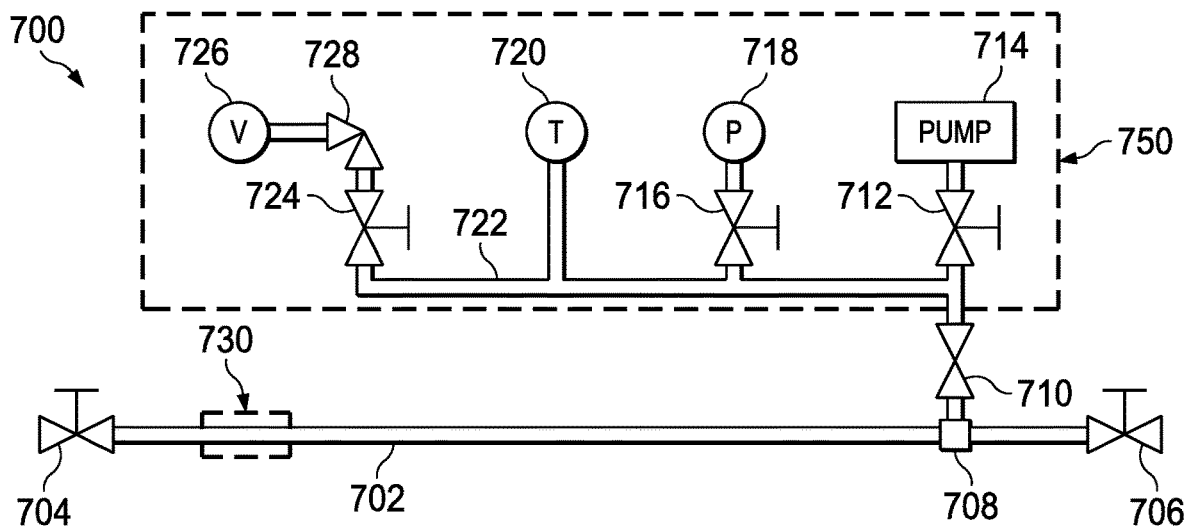

PIPELINE PRESSURE TESTING ACCOUNTING FOR MEASUREMENT UNCERTAINTIES

TECHNICAL FIELD

This disclosure relates to hydrostatic pressure strength and tightness testing of oil and gas pipelines accounting for measurement uncertainties.

BACKGROUND

Pipelines are used in the oil and gas industry to transport hydrocarbons from oil fields on land and offshore locations to oil and gas processing facilities, refineries, and distribution and shipping terminals. The pipelines are often buried underground and can be very long. Sometimes they can be 1,000 km in length in total with intermediate pump/compressor stations at typical 50-100 km sections, but it is not uncommon to be less than or greater than these lengths. Some sections of the pipeline are underground and some sections are above ground. In addition, the pipelines are subject to high pressures and temperature variations. The temperature variations cause thermal expansion of the pipeline and stress to the pipeline and the pipeline's connections.

Testing a pipeline to validate the pipeline's structural integrity is important to avoid failure of the pipeline. The structural integrity includes validating that the pipeline does not burst or fail when subject to the design pressure of the pipeline. This includes validating that no cracks or leaks occur. The structural integrity includes validating that the pipeline can withstand the design pressure without pressure loss or leaking over a specified time direction. This is referred to as "tightness" testing of a pipeline. In these tests, the pressure of a test section of the pipeline is gradually increased while validating that no leaks or pressure loss occurs.

SUMMARY

Pipelines are often hundreds of kilometers in length with some sections of the pipeline underground and some sections above ground. The pipeline is divided in several sections for pressure testing pipeline to validate the pipeline's structural integrity before it is put in service. It is not uncommon for a pipeline test section to reach 40 km in length. A leaking pipeline can be detected by a pressure drop over the length of the pipeline but it is difficult to detect where the leak is occurring. A leak that was once contained can also become a larger problem leading to a catastrophic failure such as a burst or break in the pipeline. These events are problematic from safety, environmental, and economic perspectives and should be detected and corrected before such a failure occurs.

This specification relates to systems and methods for planning and performing a pressure test of a pipeline. The pressure test is performed to validate that the pipeline and the pipeline's connections are absent of leaks and that the pipeline meets pressure standards. The pressure testing is monitored by a computer in real-time and accounts for pressure data, strain-gauge data, temperature data, as well as uncertainty of the data and uncertainties in geometry and materials of the pipeline itself. The pressure test can be performed using a kit that combines the testing functionality into a single package. The method includes a prediction capability to predict the testing beforehand to guide in the selection of test equipment and determine a range of uncertainties expected.

The test systems and methods provide an intelligent real-time decision process for assessing whether the pipe section passes or fails the pressure test. This is achieved by combining or aggregating digital and real-time recordings of several measuring devices, such as pressure sensors, temperature sensors, volume sensors, and strain gauges. The process utilizes fluid mechanics and solid mechanics principles to determine a correlation between pressure-temperature-volume of the fluid, pressure-temperature-volume of the metal, and the fluid-metal interaction to define the pressure test acceptance criteria. By processing the sensors together, a holistic perspective of the test event is obtained that may not be possible with a single sensor or by monitoring each sensor independently. Temperature of the pipe section is also recorded with the sensors and processed by the test system to determine whether or not the pressure change is related to the measured temperature change. Correlations between a temperature change and a pressure change in addition to the change in volume by thermal expansion of the pipe section and fluid is due the temperature change are performed by the test processing system. The systems and methods described in this specification account for the coupled pressure-temperature-volume response.

Errors and accuracies of the measuring devices are considered by conducting an uncertainty analysis. Sources of error exist within the test process due to estimated fluid properties, estimated pipe material properties, a variation of pressure and temperature along a pipeline, long test durations, measuring instrument installation, and/or instrument accuracies. For example, a temperature measurement by a thermocouple installed on the outer surface of a pipe section may not correspond to the fluid temperature within the pipe section. In some cases, the fluid temperature will be much less than the pipe temperature if the pipe is partially or completely buried underground. Another example is an error that is introduced into the measurement by an imprecise or uncalibrated measurement sensor. Another source of error is in the case of yielding as the change of volume of the pipe steel is assumed to be in the linear elastic range.

Guidelines and criteria are described for both the planning phase and the testing phase. The planning phase aids in the identification and selection of the appropriate measuring devices for the test. Sensor data and results of the test are accessible over a network for remote monitoring, processing, and control.

Methods for performing a pressure test of a pipe section of a pipeline can include receiving a desired pressure to be applied to the pipe section and a duration of time that the desired pressure is to be applied to an inner diameter of the pipe section; receiving a pressure measurement of a fluid, a temperature measurement of the fluid, a volume measurement of the fluid, and a strain measurement of the pipe section; determining a change in pressure of the fluid of the pipe section and a change in volume of the fluid of the pipe section; determining a pressure change uncertainty and a volume change uncertainty; checking that the pressure change uncertainty is within a pressure uncertainty threshold and that the volume change uncertainty is within a volume uncertainty threshold; determining whether the desired pressure has been applied to the inner surface of the pipe section for the duration of time; and outputting a result of the testing, the pressure change uncertainty, and the volume change uncertainty.

Systems for performing a pressure test of a pipe section of a pipeline can include a pressure sensor configured to measure a pressure of a fluid within the pipe section; a temperature sensor configured to measure a temperature of the fluid within the pipe section; a volume sensor configured to measure a volume of the fluid within the pipe section; one or more strain gauges configured to measure a strain of the pipe section; and a computer comprising the processor and a storage medium, the computer configured to: receive the pressure measurement from the pressure sensor, the temperature measurement from the sensor, the volume measurement from the volume sensor, and the strain measurement from the one or more strain gauges; and determine whether the pipe section passes the strength test and whether the pipe section passes the tightness test by accounting for an uncertainty associated with the pressure sensor, the temperature sensor, the volume sensor, and the one or more strain gauges.

Embodiments of these systems and methods can include one or more of the following features.

Some embodiments also include determining the pressure change uncertainty and the volume change uncertainty is based, at least in part, on a pressure sensor uncertainty of a pressure sensor measuring the pressure of the fluid.

Some embodiments also include determining the pressure change uncertainty and the volume change uncertainty is based, at least in part, on a temperature sensor uncertainty of a temperature sensor measuring the temperature of the fluid.

Some embodiments also include determining the pressure change uncertainty and the volume change uncertainty is based, at least in part, on a strain gauge sensor uncertainty of a strain gauge sensor measuring the strain of the pipe section. In some cases, the strain measurement is measured using: an axial strain gauge located on an outer surface of the pipe section, oriented axially along the pipe section, and configured to measure an axial strain; and a circumferential strain gauge located on the outer surface of the pipe section, oriented circumferentially along the pipe section, and configured to measure an circumferential strain.

Some embodiments also include determining whether the desired pressure has been applied to the inner surface of the pipe section for the duration of time while the pressure change uncertainty is within the pressure uncertainty threshold and the volume change uncertainty is within the volume uncertainty threshold.

Some embodiments also include receiving information representing an uncertainty associated with each of the pressure measurement of the fluid, the temperature measurement of the fluid, the volume of the fluid, and the strain measurement of the pipe section.

Some embodiments also include receiving geometric properties of the pipe section, the geometric properties comprising a diameter of the pipe section and a thickness of the pipe section, wherein the pressure change uncertainty and the volume change uncertainty are based on the geometric properties of the pipe section.

Some embodiments also include receiving material properties of the pipe section, the material properties comprising a thermal expansion of the pipe section and a yield strength of the pipe section, wherein the pressure change uncertainty and the volume change uncertainty are based on the material properties of the pipe section. In some cases, the embodiments include determining when material yielding occurs in the pipe section based on, at least in part, the pressure measurement and the volume measurement.

Some embodiments also include determining when the change is pressure is different from a theoretical change in pressure. In some cases, the embodiments further include activating a notification based on the determination that the change is pressure is different from the theoretical change in pressure. In some cases, the embodiments further include activating the notification is further based on the determination that the change is pressure is different from the theoretical change in pressure. In some cases, the embodiments further include determining when the change is volume is different from a theoretical change in volume. In some cases, the embodiments further include activating a notification when the pressure change uncertainty is not within the pressure uncertainty threshold and the volume change uncertainty is not within the volume uncertainty threshold.

Some embodiments also include applying the desired pressure to the pipe section by pumping fluid into the pipe section.

Some embodiments also include wherein the computer is further configured to determine a pressure change uncertainty of the pipe section and a volume change uncertainty of the fluid within the pipe section.

Some embodiments also include wherein the volume of the pipe section is based, at least in part, a thermal coefficient of expansion of the pipe section.

The systems and methods described in this specification provide various advantages.

Some pressure tests are destructive and cause the pipe section under test to leak, split, rupture, or explode. This can be dangerous to nearby personnel and equipment if not controlled. By monitoring the pressure and sensors during the test, the test system is configured terminate the testing before failure occurs. This improves safety of the pressure testing. For example, a controller of the test system is configured to stop the test when indications of a potential failure appear. Accounting for indication of failure decreases the likelihood that failure actually occurs and damage to nearby personnel and equipment is decreased. By including warning alarms such as a visual alarm or an audible alarm notifies personnel in the area that a failure is imminent or very likely. By monitoring in real-time, a real-time decision is made by the test system and the test system is configured to activate visual and audible alarms when necessary. The test system is also configured to identify unexpected results that occur during the testing process and the test system is configured to report these findings to personnel so that particular aspects of the test can be further investigated.

By accounting for uncertainties in the geometry of the pipeline, the material properties of the pipeline, and the various sensors, a confidence of the results is determined by the test system. This confidence reduces the risk of misinterpreting results and reduces the occurrence of false-positives and false-negative testing results. By outputting the uncertainty of the test results, a user can make an informed decision and repeat the testing with different sensors or testing equipment if necessary. By outputting the uncertainty, the risk of over-pressurizing the pipe section is reduced since the user and the controller of the test can respond to the uncertainty and abort the testing if necessary. The uncertainty analysis increases the confidence of the test and reduces the risks of failure by improper testing.

By including volume measurements, the occurrence of inconclusive test results is reduced. For example, in some cases, pressure drops are caused due to volumetric expansion of the pipe section due to plastic yielding, dispensing fluid through a pressure relief valve, a decrease in the fluid temperature, or thermal expansion of the pipeline due to solar radiation. By including strain gauge data, the fluid-solid interaction is also accounted for by the testing system.

Accounting for these effects during the testing process improves the test results and the confidence that the test was successful.

By combining a test planning process with an uncertainty analysis, the test system aids a user in determining the appropriate sensors and measurement devices for the test. This makes it easier for a user of the test to determine the equipment and increases the likelihood that the test will be performed properly.

By providing the test system as a standalone portable kit, the test can be performed in remote locations easily. The kit contains all the necessary equipment, data acquisition systems, processing capabilities, and result outputting capabilities to perform the testing.

By including a network capability within the test system, the data and results associated with the test can be uploaded to a cloud-based network. This allows a remote monitoring and archival of data and results. Multiple tests can be monitored from a single computer.

Some parameters for the pressure test are defined using testing standards. For example, in some cases, the test fluid, test pressure, and test duration are defined using test standards. For example, in some cases, American Society of Mechanical Engineers (ASME) Sec. VIII and ASME B31 series standards for the design and construction of pressure equipment or pipelines are used to define these and other test parameters. In some cases, a recommended practice for pressure testing of liquid pipelines is followed in accordance with testing standards. For example, in some cases, the American Petroleum Institute (API) Recommend Practice (RP) 1110 standard or the CSA-Z-662 standard is followed.

These testing standards sometimes recommend volume measurements be included as a test parameter. Volume is incorporated into the test when the test pressure is expected to produce hoop stress near or at the yield strength of the pipe section. These methods are improved by considering strain measurements. While these testing standards do not include strain measurements as a test parameter, the systems and methods described in this specification do include strain measurements. Strain is an important parameter in cases where a pressure vs. volume plot is recommended and the likelihood of test failure is significant or the damage due to the test is significant. For example, when large diameter pipes fail, they release a significant amount of liquid to the nearby areas. Similarly, a pipe that fails near residential areas can or environmental sensitive areas can be dangerous. Strain is considered in these cases to increase the accuracy of the test results and to avoid failing of the pipe section during the testing process. The test is preferably terminated before failure occurs by close monitoring of the test parameters.

For ease of description, terms such as "upper", "lower", "top", "bottom" "left" and "right" are relative to the orientation of the features in the figures rather than implying an absolute direction. Furthermore, the terms "sensor," and "instrument," are used interchangeably and represent all measurement devices associated with the test system.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIG. 1A is a schematic of the flow of oil from a well through a pipeline. FIG. 1B is a schematic of the distribution of oil from various wells to a processing facility and to various destination sites.

FIG. 4A is system diagram of the computer system for the testing phase of a pipeline testing process. FIG. 4B-4D are decision-tree flowcharts for the testing phase of the pipeline testing process.

FIGS. 6A-6C represent the planning phase of the pipeline testing process. FIG. 6A is system diagram of the computer system for the planning phase of a pipeline testing process. FIGS. 6B-6C are a decision-tree flowchart for the planning phase of the pipeline testing process.

FIG. 7 is a schematic of a pipeline test system according to a second embodiment.

Like reference symbols in the various drawings indicate like elements.

DETAILED DESCRIPTION

This disclosure describes a testing system and method for strength testing and tightness testing of a pipe section of a pipeline. The testing performs a hydrostatic pressure strength test to validate that the pipe section can withstand the design pressures and occasional overpressures without failure. The testing system and method also includes a tightness pressure test to validate that the pipe section does not contain any substantial leaks. The testing system includes a planning phase component and a testing phase component. The planning phase component predicts the testing results to aid in determining the appropriate measurement transducers, acquisitioning systems, and computers for performing the test. The testing phase component is used to compare testing results against expected results and make a determination whether or not the pipe section passes or fails the testing criterion. An aspect of this system and method includes an uncertainty analysis for predicting the test measurements. An aspect of this system and method includes a device for predicting the test, performing the test, and evaluating the test results.

Figure 1A:
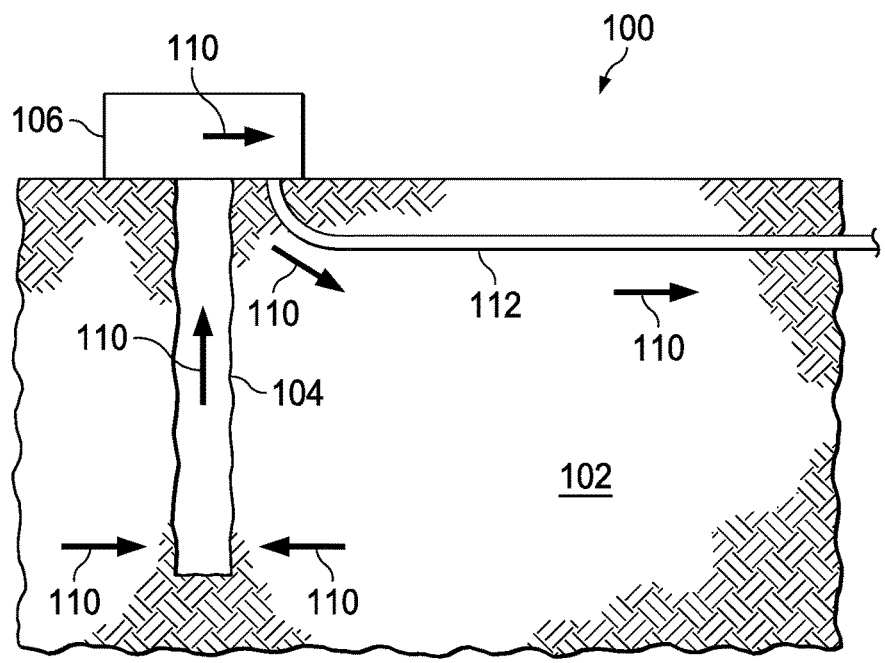
FIGS. 1A and 1B are schematics of a well and a pipeline system for oil extraction, processing, and distribution.
Figure 1B:
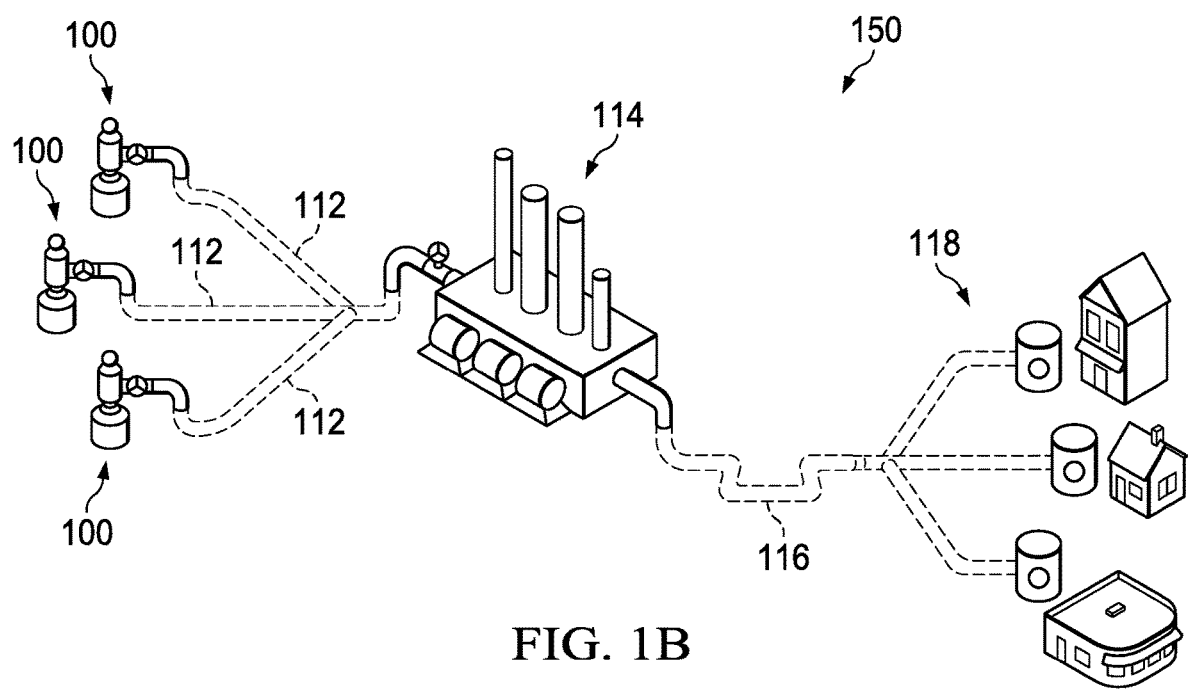

FIGS. 1A and 1B are schematics of a well 100 and a pipeline system 150 for oil and gas extraction, processing, and distribution. While the well 100 and pipeline system 150 are used for oil and gas extraction, it will primarily be described in the context of oil extraction. The well 100 includes a wellbore 104 that has been drilled into a formation 102 using a drill rig (not shown). The well 100 is used to extract oil from the formation 102 and the oil generally flows from the well 100 to an oil processing facility 114. The oil flows in a direction depicted by arrows 110 from the formation 102, through the wellbore 104, through a well cap 106, and through a pipeline 112. Several wells and pipelines are connected to the oil processing facility 114 (as seen in FIG. 1B). A transmission pipeline 116 carries the processed oil to various distribution pipelines and distribution sites 118.

Figure 2A:
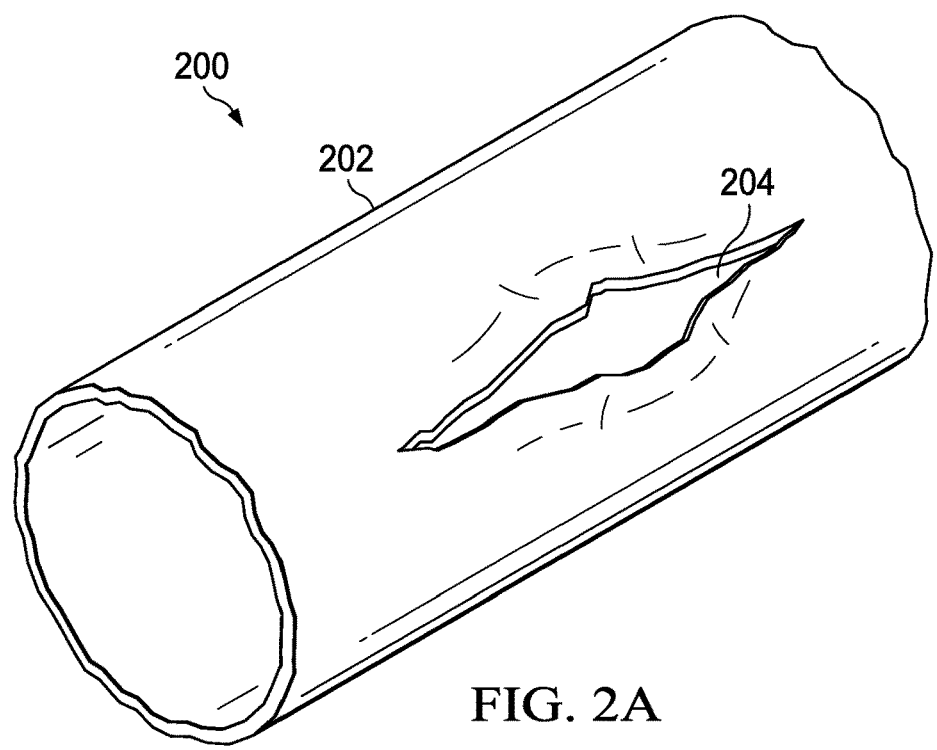
FIG. 2A is an image of a pipeline that has failed.

FIG. 2A is an image of a pipeline 202 that has failed. The pipeline 202 includes an opening 204 through a sidewall that allows fluid of the pipeline to leak out of the pipeline 202. While pipeline 202 has a large opening 204, some leaks may be much smaller, such as a crack in the sidewall of the pipeline making it harder to detect and locate the leak. This is especially difficult when the pipeline is underground.

In some cases, a pipeline fails by yielding of the material of the pipe section. Prior to yielding, a pressure vs. volume relationship of the fluid within the pipe section is linear. When yielding occurs, the slope of the pressure versus volume relationship reduces. As the slope reduces, the volume increases without a significant increase in pressure. This makes it hard to discern whether a pressure drop is due to a leak or a yielding material.

Figure 2B:
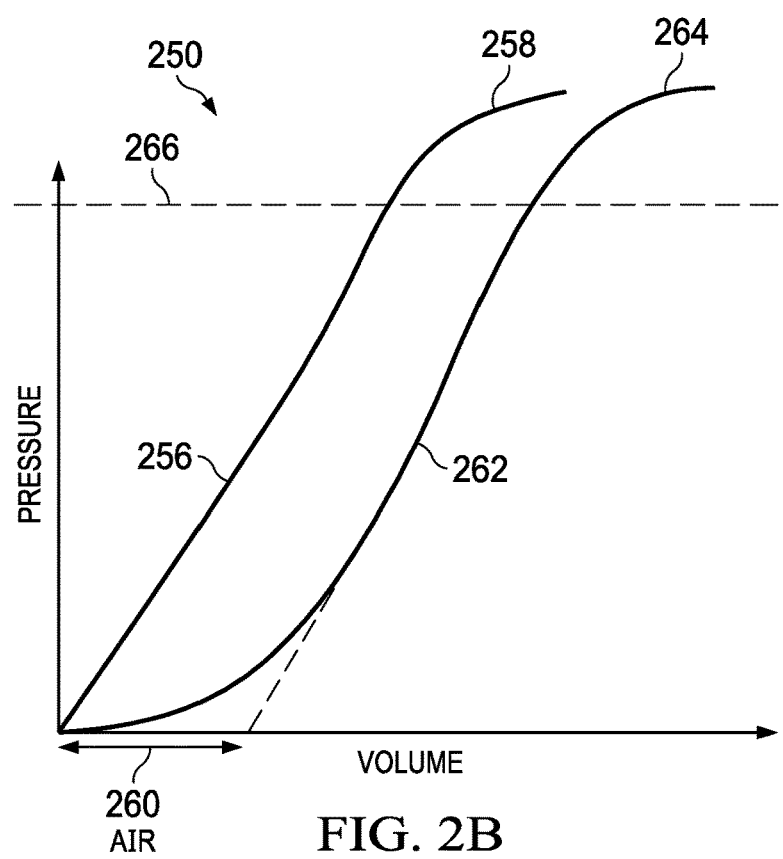
FIG. 2B is a graph of a pressure versus volume relationship for a pipeline section.

FIG. 2B is a graph of a pressure vs. volume plot 250 of a pipe section that has been tested by pumping fluid into the pipe section when sealed (isolated) from adjacent pipe sections. The graph is adapted from the Z662-Oil and Gas Pipeline standard and indicates (i) if air is present within the pipe section and (ii) if the pipe section has exceeded its elastic limit or yield strength. The graph includes pressure on the vertical axis and volume of the inflow of test fluid on the horizontal axis. If residual air is not present within the pipe section, increasing the volume of the test fluid within the pipe section will linearly increase the pressure in the pipe section (region 256). This continues until the target test pressure 266 is reached and the test pressure is either held or the test is terminated. If the test were to continue, further inflow of test fluid will cause the volume of the test fluid to increase faster than the pressure within the pipe section (region 258) indicating that the elastic limit of the material of the pipe section may be exceeded. If, on the other hand, residual air is present within the pipe section, the volume of the test fluid into the pipe section will cause the residual air to displace without significant changes in pressure (region 260). Once the residual air is compressed by the test fluid, further volume of test fluid linearly increases the pressure within the pipe section (region 262). The slope of region 256 is substantially parallel to region 262. This would continue until the pressure in the pipe section reaches the target pressure 266 and the pressure would be held or the test terminated. If the test were to continue, further inflow of test fluid will cause the volume of the test fluid to increase faster than the pressure within the pipe section (region 264) indicating that the elastic limit of the material of the pipe section may be exceeded.

By monitoring the pressure vs. volume plot for regions of decreasing slope and high pressure, the systems described in this specification detect when the elastic limit approached. High pressure is usually defined by pressures near the target test pressure, but other definitions of high pressure can be used. For example, when the systems detect that the slope of region 258 has decreased to be half of the slope of the linear region 256, the system indicates that the elastic limit of the pipe section is being approached. By monitoring the pressure vs. volume plot for regions with increasing slope and low pressure, the systems described in this specification detect when air is present in the system. Low pressure is usually defined by pressures near the starting test pressure of the system. For example, when the systems detect that the slope of region 260 is zero, the system indicates that air is being displaced.

Figures 3A, 3B:
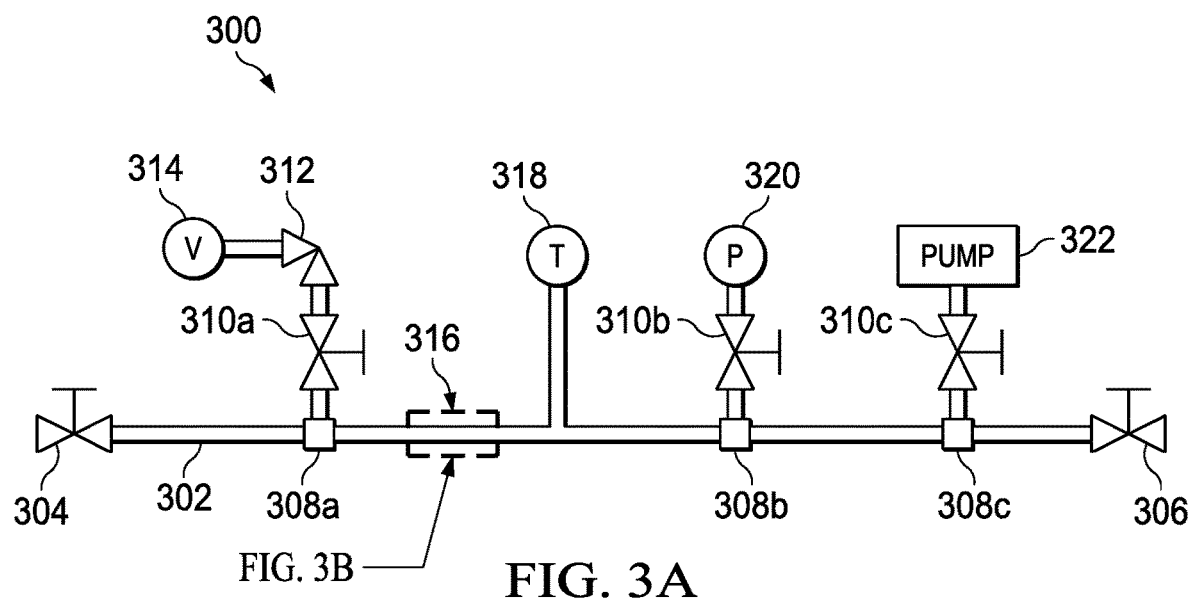
FIG. 3A is a schematic of a pipeline test system.
FIG. 3B is detail view of a portion of FIG. 3A showing the mounting of axial and circumferential strain gauges.

FIG. 3A is a schematic of a pipeline hydrostatic test system 300. A pipe section 302 represents a section of a pipeline that is blocked by two isolation points. The blockage is caused by closing a left valve 304 and closing a right valve 306 of the pipeline to cause fluid within the pipe section 302 to be isolated from the rest of the fluid in the pipeline. While valves 304, 306 are shown in FIG. 3A, some isolation methods use blanks, blind flanges, or flange testers. While the valves 304, 306 are manual valves, in some cases, the valves are solenoid valves and computer controlled.

Pipe section 302 includes three ports 308 for fluidly connecting test equipment to the pipe section 302. Each port 308 is fluidly connected to a valve 310 so that each port 308 can be opened and closed by an associated valve. While the valves 308 are manual valves, in some cases, the valves are solenoid valves and computer controlled. Port 308a is fluidly connected through valve 310a to a pressure relief valve 312 configured to purge test fluid from the pipe section 302 when the pressure exceeds a pre-determined threshold. A volume of fluid that flows through the pressure relief valve 312 is monitored by a flow sensor 314. Flow sensor 314 monitors the volume measurement and is electrically connected to a data acquisition system of a computer for recording the volume measurement. In some cases, an additional vent valve is used for purging air during a filling process.

Strain gauges 316 are located on the pipe section 302 and electrically connected to a data acquisition system of the computer. An axial strain gauge 316a (shown in detail 350 in FIG. 3B) is oriented to measure axial elongation of the pipe section 302 during the testing. A circumferential strain gauge 316b (shown in detail 350 in FIG. 3B) is oriented to measure a circumferential elongation of the pipe section 302 during testing. These strain gauges are shown in further detail in FIG. 3B.

Test system 300 includes a test pump 322 fluidly connected to the pipe section 302 through the valve 310c. Test pump 322 is electrically connected to a computer controller for controlling the operation of the test pump 322. The test pump 322 is configured to pressurize and de-pressurize the fluid within the pipe section 302 and monitor the volume of fluid passing through the test pump 322. The volume of fluid is electrically communicated to the computer for monitoring and recording. In some cases, the test pump 322 pumps water into the pipe section 302 to increase pressure. In some cases, the test pump 322 is a reciprocating pump.

Pressure is monitored by a pressure sensor 320 fluidly connected through valve 310b. Pressure sensor 320 is electrically connected to a data acquisition system of a computer and is configured to monitor and record the fluid pressure within the pipe section 302.

Temperature is monitored by a temperature sensor 318 that is directly attached to the pipe section 302. In some cases, the temperature sensor 318 is a thermocouple that is electrically connected to a data acquisition system of a computer. In some cases, the temperature sensor 318 is a non-intrusive thermocouple. It is preferred if the temperature sensor 218 is installed on an underground section of a surface of the pipe section 302 to reduce the effect of heating by solar radiation. Heating by solar radiation causes undesired temperature fluctuations for above-ground pipelines.

In preparation for the strength and tightness testing of the pipe section 302, the pipe section 302 is blocked by two isolation points 304, 306 from the rest of the pipeline. Pipe section 302 is initially filled with a test fluid. In some cases, the test fluid is water. In some cases, the pipe section 302 is isolated from the pipeline and then filled with a test fluid. Air within the test section 302 is vented during the filling process from the highest point in the line. The test pump 322 is used to deliver an additional volume of the test fluid causing an increase in test fluid pressure. The test pump 322 continues increasing the test fluid pressure until the strength pressure is obtained.

The strength test pressure represents a pressure of the pipe section that must be reached without failure. A substantial loss in pressure represents a leak. For example, a loss in pressure of 5% might represent a leak. The strength test pressure and the test duration for maintaining the strength test pressure are determined or selected using applicable codes, standards, or regulations. In some cases, the strength test value is defined as 1.25 times the design pressure for 30 minutes.

While the pipe section 302 is at the strength pressure, a visual inspection of the pipe section 302 is performed using cameras to validate that no valves or fluid connections are leaking and that the pipe section 302 has not failed. This visual inspection is in addition to the monitoring of the test sensors by the computer. In some cases, the test is destructive and the pipe section 302 ruptures or fails. In some cases, small defects developed during the pipe manufacturing and construction cause a leakage. In the case of a leakage, the quantity of leaked fluid and the associated pressure drop of the pipe section 302 depend on a defect size and a duration of the pressure test.

The test pressure of the pipe section 302 is decreased to the tightness pressure. This is achieved by purging the pressure of the pipe section 302 using the pressure relief valve 312 or running the test pump 322 in reverse to pump a quantity of test fluid from the system. The tightness pressure represented a pressure of the pipe section that must be reached and held for a duration of time without a substantial loss in pressure. For example, a loss in pressure of 5% might represent a failed test. In some cases, the tightness pressure is 95% of the strength test pressure. In some cases, the duration of maintaining the tightness pressure is 4 hours for an above ground installation. In some cases, the duration of maintaining the tightness pressure is 24 hours for buried installations.

Two particular challenges of the testing include (i) performing testing at pressures at or above the Specified Minimum Yield Strength (SMYS) of the pipeline, and (ii) performing tightness testing of buried pipelines for long durations (for example, up to 24 hours). Performing testing at pressures at or above the SMYS of the pipeline is performed in pipelines that have multiple segments with different pressure requirements. This also occurs in pipelines that have substantially more static head pressure in some locations. Having one test pressure and one pressure test level that can be applied to each section of the pipeline will reduce cost and time of the testing. In these cases, a range between the minimum and maximum pressure has to be carefully determined so that the minimum pressure meets the minimum code standards, and the maximum pressure does not cause failing of the pipe section (for example, by rupture or pipe yielding). For example, the pipe section is to be tested at a minimum of 90% of the SMYS of the pipe material and shall not exceed a maximum of 100% SMYS at any point of the pipe section.

Performing tightness testing of buried pipelines for long durations is helpful to increase confidence of the tightness of the pipeline system. In some cases, girth welds are buried and not visible during the initial strength pressure testing. In some cases, the strength pressure test is held for a duration of 30 minutes to 2 hours. The pressure is then reduced by 5 to 10% and held for another 24 hours to monitor for pressure drops of the test system. A pressure drop of more than 5% might be indicative of a leakage in the system.

The computer continuously monitors the sensors and input measurements and determines if the strength test and tightness test are completed successfully. In the event of a successful completion, the user is presented with a notification that the test is complete. In the event of a failed test, the user is notified of a failed test.

In some cases, the outcome of the strength and tightness testing is inconclusive, false positive, or false-negative. In some cases, this undesired result occurs when minor pressure drops are caused by volumetric expansion of the pipe section 302 from plastic yielding, expelling fluid through the pressure relief valve 312, or by a decrease in the fluid temperature. For example, a pipe section in direct sunlight will expand according to the thermal coefficient of the material of the pipe section. The expanding volume of the pipe section will inversely affect the pressure in the pipe section. The method described in this specification accounts for the effect that temperature and strain have on the pressure and volume of the pipe section. The process includes corrections to the pressure-temperature-volume relations. In particular, the process determines a correlation between the pressure-temperature-volume relations of the test fluid, the pressure-temperature-volume relations of the metal, and the fluid-metal interaction to define the pressure test acceptance criteria.

In some cases, uncertainties, error bounds, or inaccuracies in a test measurement sensor affect the test results. In some cases, these uncertainties cause the inconclusive, false-positive, or false-negative results previously descried. In some cases, these uncertainties are known by a manufacturer of a sensor and is published in a data sheet. In some cases, these uncertainties are determined through a calibration procedure. For example, a temperature sensor might indicate an uncertainty of ±1 F, a pressure sensor might indicate an uncertainty of ±1 psi, and a volume sensor might indicate an uncertainty of ±1% of the volume added.

The systems and methods described in this specification include uncertainty information for each sensor used during the test. In some cases, the user specifies an uncertainty for the pressure sensor, the temperature sensor, the volume sensors, and the strain gauges as input to the computer. The computer performs an uncertainty analysis to include the effect of these uncertainties on the test measurements to determine an uncertainty of the pressure result and an uncertainty to the volume result of the pipe section. If the uncertainties are outside of a threshold, then the user is notified that the results may be inaccurate. At the end of the test, the user is presented with the uncertainty values along with the pass/fail assessment. The pass/fail assessment is based on the developed criteria accounting for the acceptance of uncertainty values so a confidence assessment of the results can be made by the user.

To further aid in the selection of the measurement sensors for a particular test, the systems and methods described in this specification can be configured to perform the opposite task. By inputting the desired uncertainty limits for the resulting pressure and volume, the system is configured to determine the uncertainty limits for each measurement sensor. The system also accounts for cases where volume sensors are not used and cases where strain gauges are not used. A user would use this uncertainty information to acquire the proper sensors to perform the desired strength and tightness testing.

Figure 4A:
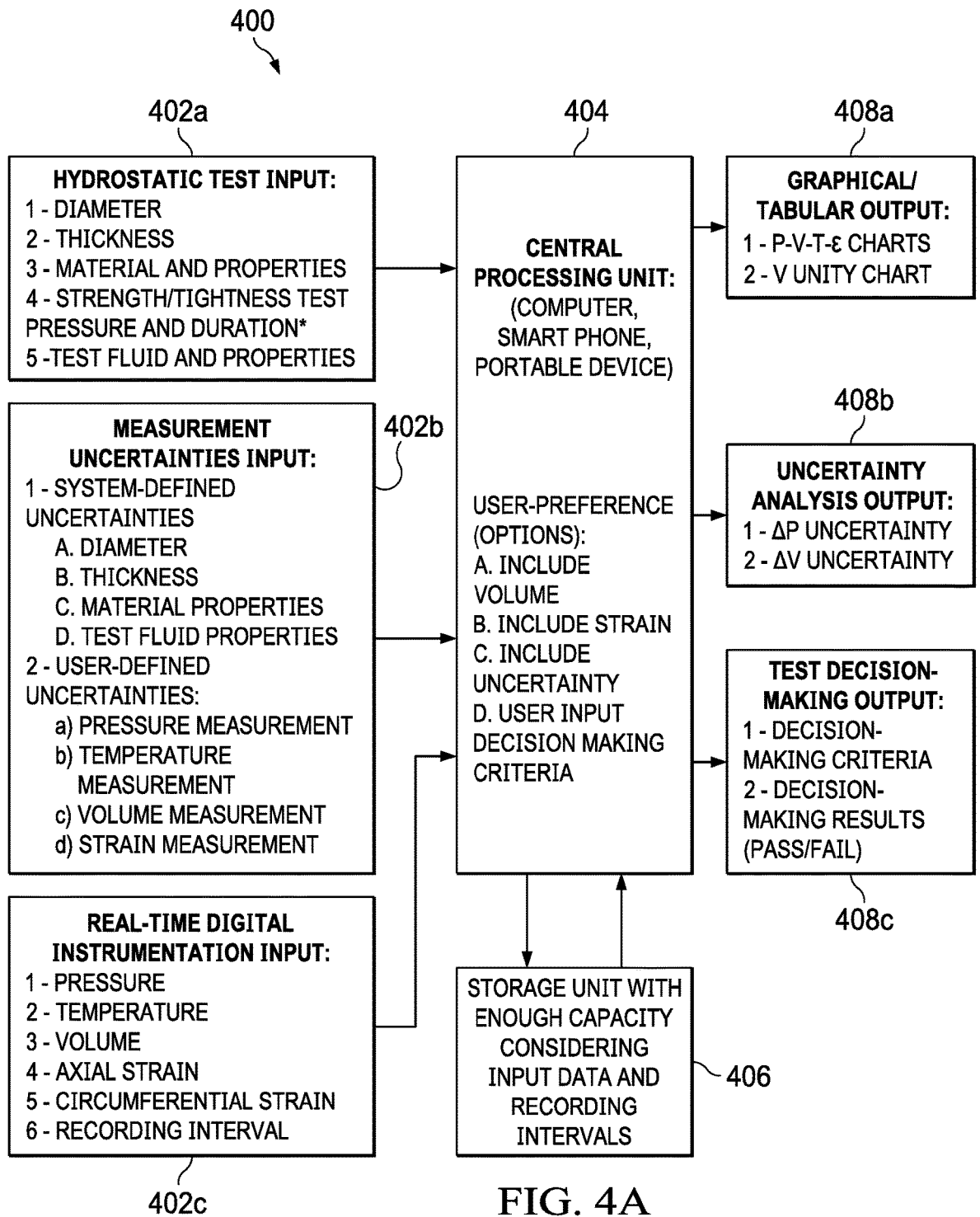
FIGS. 4A-4D represent the testing phase of the pipeline testing process.

FIG. 4A is a system diagram of a computer system 400 for the testing phase of the pipeline hydrostatic test system 300. Computer system 400 includes various inputs 402, a processor 404, a storage medium 406, and various outputs 408.

In some cases, inputs 402 are defined by a user of the computer. In some cases, inputs 402 are defined by the computer system 400 itself. For example, in some cases, the computer system 400 retrieves the inputs 402 from a storage medium 406 of the computer system 400. In some cases, the computer system 400 retrieves the inputs 402 over a network or from cloud-based server.

Inputs 402 include a hydrostatic test input 402a, a measurement uncertainties input 402b, and a real-time digital sensor instrumentation input 402c. Inputs 402 include a preference on whether or not to include volumetric data and whether or not to include strain gauge data in calculations performed by a central processing unit 404 of the computer.

The hydrostatic test input 402a defines geometrical properties of a pipe section to be tested. The geometric properties include a diameter of the pipe section, a thickness of the pipe section. The hydrostatic test input 402a further defines a material of the pipe section and properties of the material. In some cases, the material properties include a thermal coefficient of expansions, a stiffness, a Poisson's ratio, and a yield strength. The geometric properties together with the material properties are used to predict the expected changes in volume and pressure based on the temperature of the pipe section. The hydrostatic test input 402a further includes a strength test pressure, a tightness test pressure, and a duration for each of these tests that are used to control the test procedure.

The measurement uncertainties input 402b include system-defined uncertainties that correspond to the hydrostatic test input 402a values. The system-defined uncertainties include an uncertainty in the diameter input of the pipe section. For example, in some cases, this uncertainty is caused by a poor measurement of the diameter of the pipe section. The system-defined uncertainties include an uncertainty in the thickness of the pipe section as well as uncertainties associated with the material properties and test fluid properties.

The measurement uncertainties input 402b include user-defined uncertainties that correspond to the real-time digital instrumentation input 402c values. The user-defined represent uncertainties of the measurement devices as previously described. The user-defined uncertainties can include a pressure measurement uncertainty, a temperature measurement uncertainty, a change in volume uncertainty, and a strain measurement uncertainty. For example, in some cases, the temperature measurement uncertainty is ±1° F., the pressure measurement uncertainty is ±1 psi, and the volume measurement uncertainty is ±1% of the volume added.

The real-time digital instrumentation input 402c includes data from the data acquisition system of the computer. This data includes measurements of pressure, temperature, volume, axial strain, circumferential strain, and information related to the recording interval. In some cases, this data includes information related to the geographic location of the test event, live-stream camera data or other photographic input, and information related to the ambient conditions of the environment surrounding the pipe section under test.

The central processing unit 404 is embedded in the computer system. In some cases, the central processing unit 404 is embedded in a portable device such as a smart-phone or smart-watch. The central processing unit 404 is configured to communicate with a network adapter to receive and transmit data over a wired, wireless, or a cloud-based network connection. The central processing unit 404 determines the testing criteria based on the received input 402. Specifically, the central processing unit 404 determines whether to include volume, strain, and uncertainty data in the testing process. The function of the central processing unit 404 is further depicted in the flowchart and decision tree 450 of FIG. 4B. The central processing unit 404 is coupled to the storage medium 406 with enough storage capacity for storing the input data and the recorded measurement data.

Computer system 400 includes outputs 408 that define how the results computed by the central processing unit 404 are presented to a user and/or recorded to a storage medium (such as the storage medium 406). The outputs 408 include three categories: graphical/tabular output 408a, uncertainty analysis output 408b, and test decision output 408c. The outputs 408 provide a visual display of the test data, the resulting uncertainties in pressure and volume, and an indication of whether or not the pipe section has passed or failed the test.

The graphical and/or tabular output 408a includes pressure vs. volume vs. temperature vs. strain plots, or any combination of the test results. A user is able to selectively query this output to assess the predicted pressures, volumes, temperatures, and strains during the testing. The graphical and/or tabular output 408a also includes volumetric unity charts which represents the volume change predicted by pressure change vs. the volume change measured by the strain gauge. The uncertainty analysis output 408b includes a change in pressure uncertainty (ΔP) and a change in volume uncertainty (ΔV). The uncertainties are determined based on the conditions of the uncertainty analysis. The test decision making output 408c indicates whether the pipe section passes or fails the test.

Figure 4B:
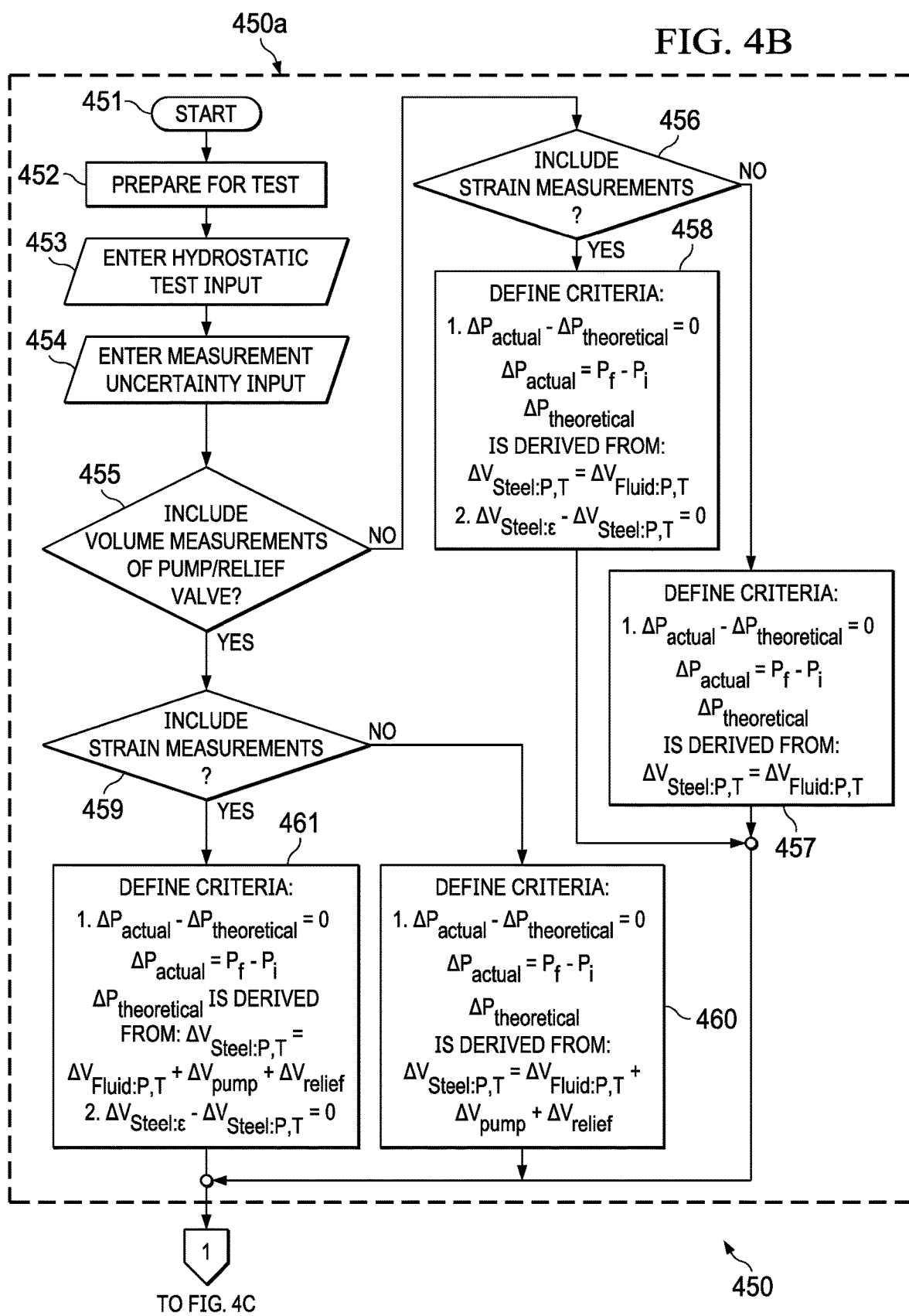
Figure 4C:
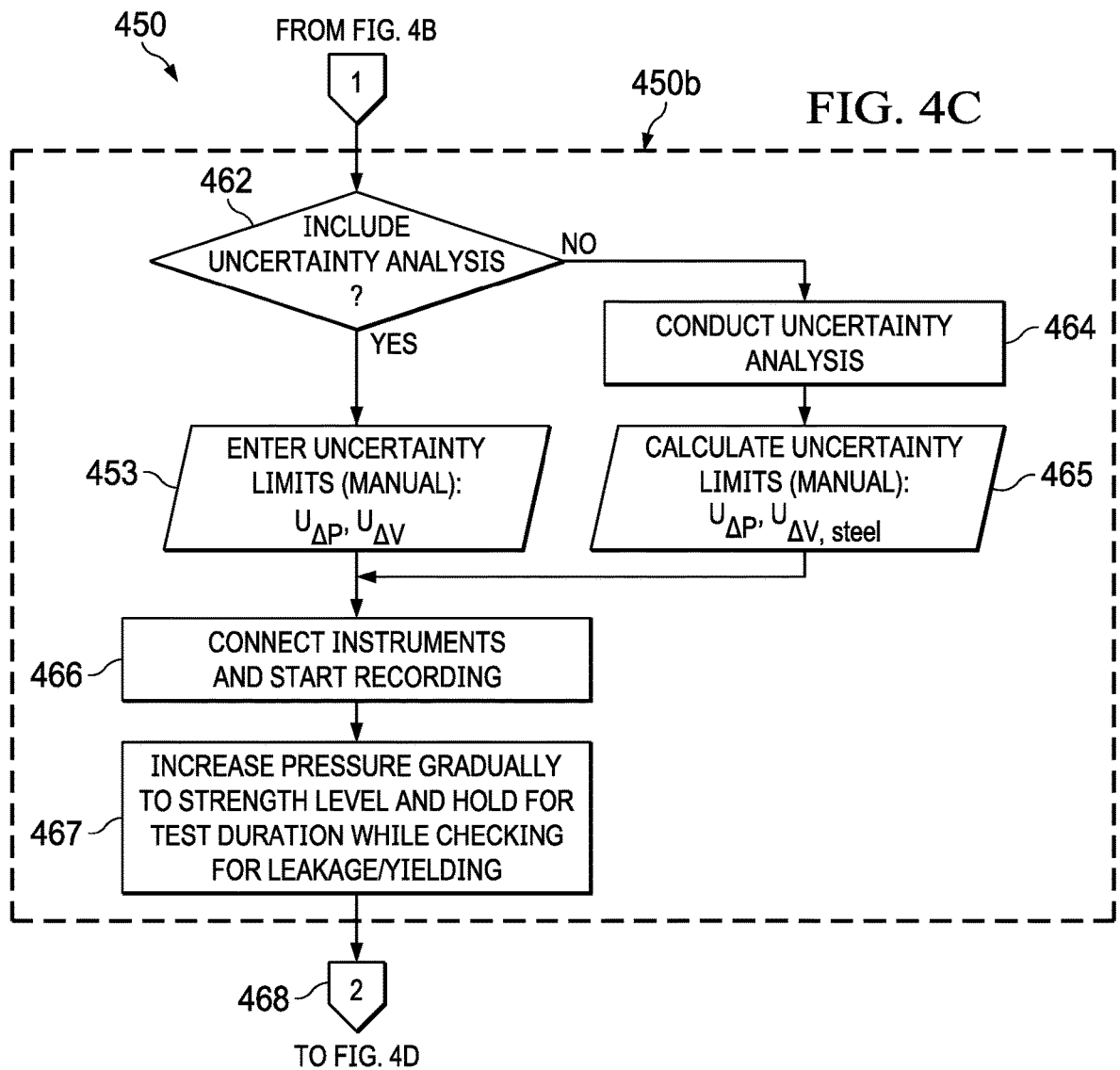
Figure 4D:
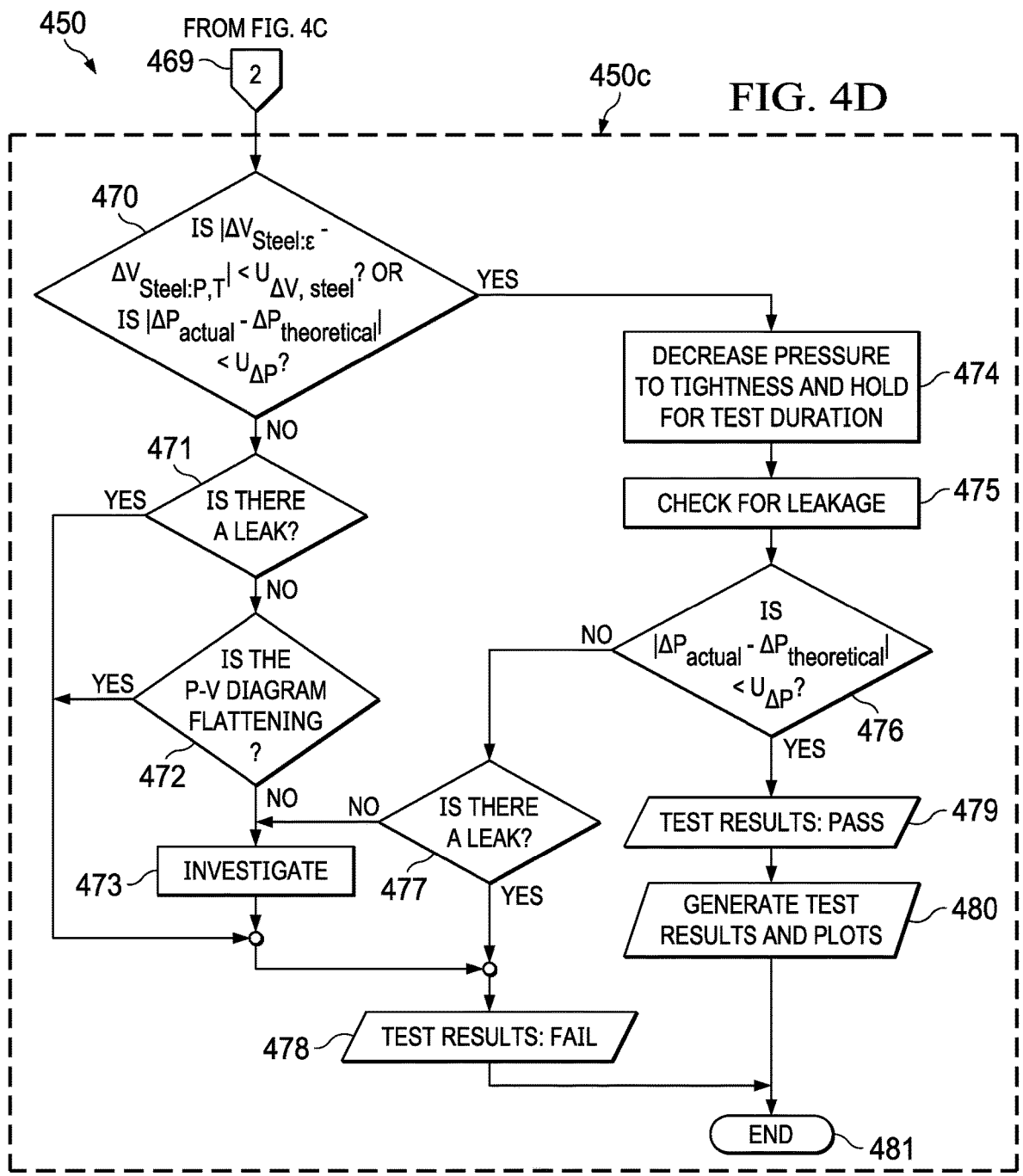

FIGS. 4B-4D are decision trees of a method 450 for the testing phase for the pipeline hydrostatic test system 300. The method 450 is computer-implemented on the computer system 400. The method 450 is implemented using a computer software programming language such as Matlab or LabVIEW, but it is not limited to a specific software. Based on the real-time measurement inputs, a real-time analysis is performed to determine whether or not the pipe section passes or fails the test. In some cases, the method is executed every 1 second or less. In some cases, the method is executed 100 times a second. The method 450 also generates, displays, and saves the test results and data plots. The method 450 includes a criterion determination 450a process and an uncertainty determination 450b process.

Method 450 starts (step 451) and includes preparing for the test according to industry recommended practices (step 452). For example, in some cases, API RP 1110 or equivalent test standards are used to determine the planned test pressure and test period, install the test equipment, install the required sensors and instruments with proper calibration, fill test fluid and vent air from the test, and develop safety requirements.

Method 450 includes receiving or defining hydrostatic test input (step 453) and receiving or defining measurement uncertainty input (step 454). These inputs are typically received or selected by a user but can also be determined by the computer. For example, in some cases, the inputs are determined by retrieving input information from data storage of a computer. In some cases, the measurement uncertainties are determined from equipment manufacturer specifications.

Method 450 determines a theoretical change in pressure expected $\Delta P_{theoretical}$ and a volumetric change of the pipe section material $\Delta V_{Steel:P,T}$, where the "Steel" subscript represents the material of the pipe section. While "Steel" is used to denote a pipe section of a steel material, in some cases, steel alloys, composites, or aluminum alloys are used. Subscripts "P" and "T" denote pressure and temperature, respectively. The volume change, $\Delta V_{Steel:P,T}$, represents a change in volume of the pipe section and is dependent on the pressure of the fluid within the pipe section and the temperature of the pipe section. In addition, the calculation to determine $\Delta V_{Steel:P,T}$ is dependent on (i) whether the volumetric flow rate of the test pump and pressure relief valve is accounted for during the test and (ii) whether strain gauge data is accounted for during the test.

Determining $\Delta P_{theoretical}$ and $\Delta V_{Steel:P,T}$ depends on the particular testing conditions for the pipe section. For example, when the pipe section is fully restrained, $\Delta P_{theoretical}$ and $\Delta V_{Steel:P,T}$ are determined by using, $$\frac{\Delta V_{Steel:P,T}}{V_0} = \left(\frac{1-\upsilon^2}{E} \times \frac{D}{t} + A\right)\Delta P_{theoretical} - B\Delta T \quad (1)$$

where $V_0$ is the initial volume of the pipe section (liters), $\upsilon$ is the Poisson's ratio of the material of the pipe section, E is the modulus of elasticity of the pipe section (kPa), D is the outside diameter of the pipe section (mm), t is the wall thickness of the pipe section (mm), A is the compressibility of the test fluid (kPa$^{-1}$), B is the thermal expansion coefficient of the test fluid corrected for the effect of pipe section expansion (° C.$^{-1}$) and $\Delta T$ is the change in temperature of the pipe section (° C.). For a pipe section made of steel, $\upsilon=0.27$ and $E=206\times10^6$ kPa. For water as the test fluid, A depends on temperature and pressure as. For example, $$A = (3.897 \times 10^3 \times T^2 - 0.31133 \times T + 50.64) \times \left(1 - \frac{\Delta P_{theoretical}}{411844}\right) \times 10^{-8} \quad (2)$$

In some cases, other volume-pressure-temperature relationships are used. For example, other relationships from the Australian Standard AS 2885.5:2012, Appendix C can be used.

If method 450 determines that volume measurements of the pump should not be included (step 455) and that strain measurements should also not be included (step 456), the method 450 determines $\Delta P_{theoretical}$ and $\Delta V_{Steel:P,T}$ (step 457) by considering that the volumetric expansion of the steel test pipe is equal to the volumetric expansion of the fluid within the test pipe $\Delta V_{Steel:P,T}=\Delta V_{Fluid:P,T}$, where $\Delta V_{Fluid:P,T}$ is determined from the pressure of the fluid and the temperature of the pipe section, and $\Delta P_{theoretical}$ is determined in accordance with testing standards AS/NZS 2885.5:2012 Appendix C or using a similar formulation for the pressure-volume-temperature relations. In addition, the constraints $\Delta P_{actual}-\Delta P_{theoretical}=0$ and $\Delta P_{actual}=P_f-P_i$ are imposed, where $\Delta P_{actual}$ is the actual pressure measured by the pressure sensor, $P_f$ is the final (or current) pressure measured, and $P_i$ is the initial pressure measured at the beginning of the test.

If method 450 determines that volume measurements of the pump should not be included (step 455) but that strain measurements should be included (step 459), the method 450 determines $\Delta P_{theoretical}$ and $\Delta V_{Steel:P,T}$ using criteria (step 458) which is substantially similar to the previously described criteria (step 457) but further includes the condition: $\Delta V_{Steel:\varepsilon}-\Delta V_{Steel:P,T}=0$, where $\Delta V_{Steel:\varepsilon}$ is the volumetric change measured by the strain gauges. In this case, the volumetric expansion of the pipe section is determined from the strain gauges and not the pressure temperature relations.

If method 450 determines that volume measurements of the pump should be included (step 455) but that strain measurements should not be included (step 459), the method 450 determines $\Delta P_{theoretical}$ and $\Delta V_{Steel:P,T}$ using criteria (step 560) by accounting for the volumetric change of the system by the pump, $\Delta V_{pump}$, and by the pressure relief valve, $\Delta V_{relief}$. The volumetric expansion of the steel test pipe is determined as $\Delta V_{Steel:P,T}=\Delta V_{Fluid:P,T}+\Delta V_{pump}+\Delta V_{relief}$. The theoretical pressure in the pipe section, $\Delta P_{theoretical}$, is determined in accordance with the test standard AS/NZS 2885.5:2012 Appendix C or using a similar formulation for the pressure-volume-temperature relations. In addition, the constraints $\Delta P_{actual}-\Delta P_{theoretical}=0$ and $\Delta P_{actual}=P_f-P_i$ are imposed.

If method 450 determines that volume measurements of the pump should be included (step 455) and that strain measurements should also be included (step 459), the method 450 determines $\Delta P_{theoretical}$ and $\Delta V_{Steel:P,T}$ using criteria (step 461) which is substantially similar to the previously described criteria (step 461) but further includes the condition: $\Delta V_{Steel:\varepsilon}-\Delta V_{Steel:P,T}=0$, where $\Delta V_{Steel:\varepsilon}$ is the volumetric change measured by the strain gauges. In this case, the volumetric expansion of the pipe section is determined from the strain gauges which is compared with the pressure temperature relations. Pressure vs. temperature relations are still used in this step to identify $\Delta V_{Steel:P,T}$ and $\Delta V_{Fluid:P,T}$ Method 450 receives or determines an indication of whether an uncertainty analysis should be performed (step 462) to compute the uncertainty limits $U_{\Delta P}$ and $U_{\Delta V,steel}$, where $U_{\Delta P}$ is the desired uncertainty limit of the pressure measurement and $U_{\Delta V, steel}$ is the desired uncertainty limit of the volumetric measurement. If the uncertainty analysis is performed, the processor conducts the uncertainty analysis (step 464) and computes the uncertainty limits $U_{\Delta P}$ and $U_{\Delta V,steel}$ as output of the uncertainty analysis based on all the received input. For example, in some cases the uncertainty analysis is conducted using Moffat, R. J. "Contribution to the Theory of Single-Sample Uncertainty Analysis" Journal of Fluids Engineering. Vol. 104, 1982, pp 250-260. If the uncertainty analysis is not performed, the method 450 requests a definition of these uncertainty limits (step 463) so that quality checks can be performed by the method 450 and output to the user for monitoring.

Method 450 instructs the user to connect sensors/instruments and begin recording. Once complete, the processor begins recording the measurements (step 466). The processor sends a command to the test pump to gradually begin increasing the pressure of the pipe section to the strength pressure and maintains the strength pressure for a duration of time to continue monitoring for leaks or failure (step 467). For example, in some cases, the pressure is increased by 10 psig/min or less. The system continuously monitors the pressure while the system increases pressure and maintains the pressure. In some cases, a test standard is followed for gradual pressurizing and leakage inspection including inspecting each valve associated with the test system and each connection in accordance with industry recommended practices. For example, in some cases, an API RP 1110 or equivalent test specification is followed.

Method 450 proceeds from marker 468 on FIG. 4B to marker 469 on FIG. 4C. The entire method 450 including the previously described criteria (steps 457, 458, 460, 451) and the method 450c (seen on FIG. 4C) is applied with every incremental increase in volume and added pressure. For example, in some cases, the system processes the following steps in 1 second intervals. In some cases, the system processes the method 100 times a second.

Method 450 determines if the absolute difference between the volumetric expansion of the pipe section determined by the strain gauges and the volumetric expansion of the pipe section determined by the pressure and temperature relations are within the desired volume uncertainty. The method 450 also determines if the absolute difference between the actual pressure data and the theoretical pressure data is within the pressure uncertainty. The method 450 determines if at least one of these conditions is satisfied. This is represented as (step 470):

$$|\Delta V_{Steel:\varepsilon} - \Delta V_{Steel:P,T}| < U_{\Delta V, steel} \text{ OR } |\Delta P_{actual} - \Delta P_{theoretical}| < U_{\Delta P} \quad (3)$$

If Eq. (3) is not satisfied, the method 450 determines if a leak is present (step 471). A leak is determined by a pressure drop. In some cases, a pressure drop of 5% pressure drop indicates that a leak may be present in the system. If no leak is present, the process determines if the pressure vs. volume response is flattening (step 472) by determining when the response deviates from a straight line (as shown in FIG. 2B). This deviation is detected when the straight line starts to become non-linear and indicates that the elastic limit of the pipe section may be exceed.

If the pressure vs. volume response is not flattening, method 450 notifies a user to investigate the test (step 473) to determine a potential problem by a potential leak or potential yielding of the pipe section. For example, in some cases, reasons to investigate include: incorrect sensor connections, incorrect sensor calibrations, incorrect uncertainty range, incorrect entry of input data, volume of fluid from relief valve not accounted for, and/or leakage is visibly obscured by a coating or sand burial of the pipe section. The method 450 proceeds to indicate a failed test to a user (step 478). In some cases, notification of a failed test is reported by an audible alarm and a visual alarm and the method concludes (step 481).

If method 450 determines a leak (step 471) the method proceeds to indicate a failed test to a user (step 478) and concludes (step 481). If the method determines that the pressure vs. volume response is flattening the method proceeds to indicate a failed test to a user (step 478) and concludes (step 481).

Returning to step 470, if Eq. (3) is satisfied the method 450 commands the pump to decrease pressure to the tightness test and maintain the tightness pressure for the duration of the tightness test (step 474). The method 450 monitors for a leakage of fluid (step 475) in accordance with testing standards for gradual pressurizing and inspection of leakage including an inspection of each valve and each connection. For example, in some cases, the monitoring for leaks is performed in accordance with the API RP 1110 specification or equivalent.

Method 450 determines if the following condition is satisfied:

$$|\Delta P_{actual} - \Delta P_{theoretical}| < U_{\Delta P} \quad (4)$$

If Eq. (4) is not satisfied, method 450 determines if there is a leak present (step 477). If there is no detected leak, then the method 450 notifies a user to investigate the problem (step 473). If the system detects a leak, then the method 450 determines that the pipe section has failed the test (step 478).

Returning to step 476, if Eq. (4) is satisfied then the test is determined to be successful (step 479) and the pipe section has passed the strength test and the tightness test. In some cases, notification of a successful test is reported by an audible alarm and a visual alarm.

Upon a successful test, test results and data plots are generated and presented to a user using the computer (step 480). In some cases, test reports include: individual pressure vs. volume vs. temperature vs. strain (P-V-T-ε) data plots, charts, and data logs, P-V-T-ε charts with or without uncertainty limits, and V unit charts with or without uncertainty limits.

Figure 5:
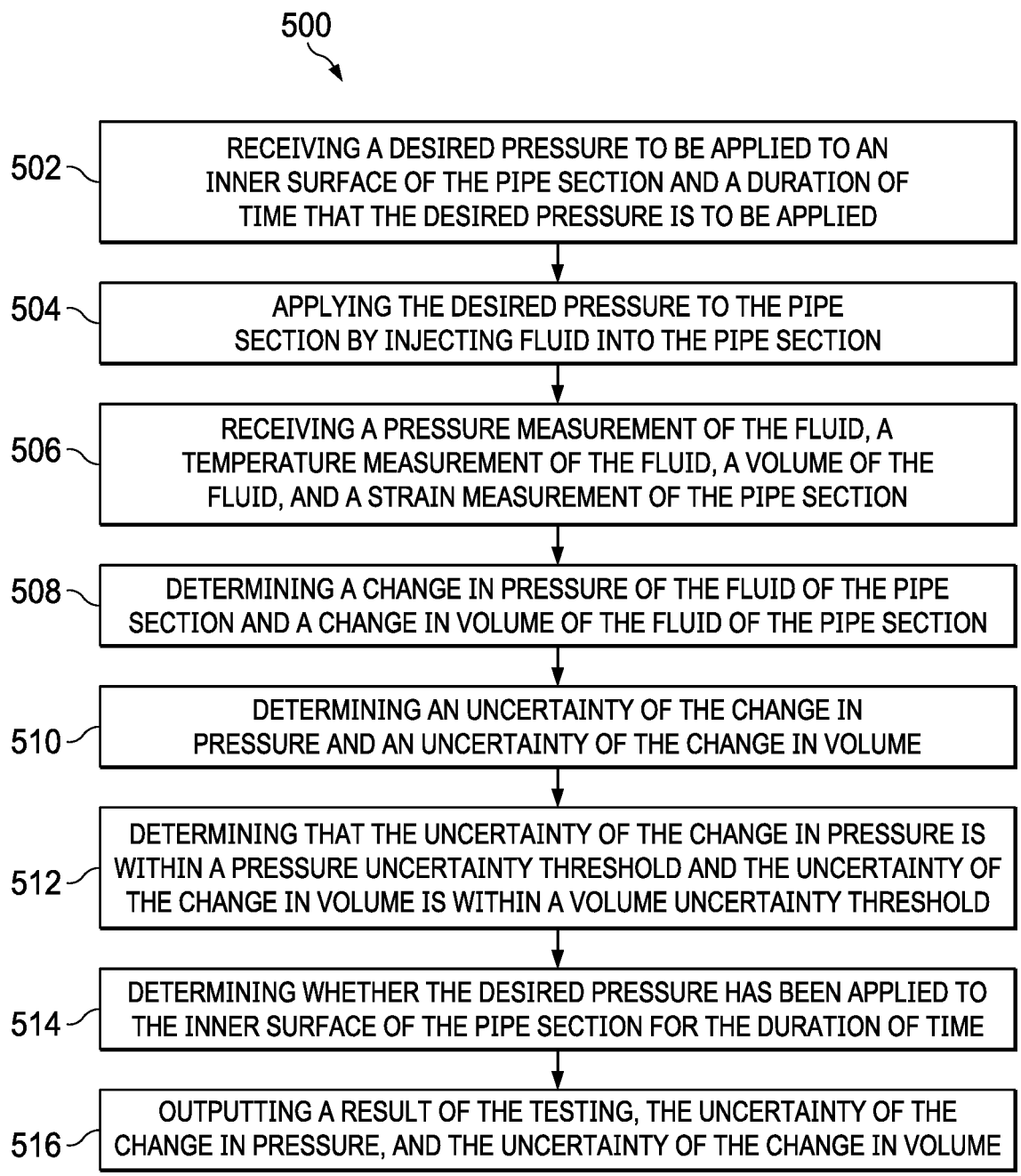
FIG. 5 is a flowchart for the testing phase of the pipeline testing process.

FIG. 5 is a flowchart 500 representing the method 450. The method includes receiving a desired pressure to be applied to the pipe section and a duration of time that the desired pressure is to be applied to the pipe section (step 502). The method includes applying the desired pressure to the pipe section by injecting fluid into the pipe section (step 504). The method includes receiving a pressure measurement of the fluid, a temperature measurement of the fluid, a volume measurement of the fluid, and a strain measurement of the pipe section (step 506). The method includes determining a change in pressure of the fluid of the pipe section and a change in volume of the fluid of the pipe section (step 508). The method includes determining an uncertainty of the change in pressure (a pressure change uncertainty) and an uncertainty of the change in volume a (volume change uncertainty) (step 510). The method includes determining that the uncertainty of the change in pressure is within a pressure uncertainty threshold and that the uncertainty of the change in volume is within a volume uncertainty threshold (step 512). The method includes determining whether the desired pressure has been applied to the inner surface of the pipe section for the duration of time (step 514). The method includes outputting a result of the testing, the uncertainty of the change in pressure, and the uncertainty of the change in volume (step 516).

Figure 6A:
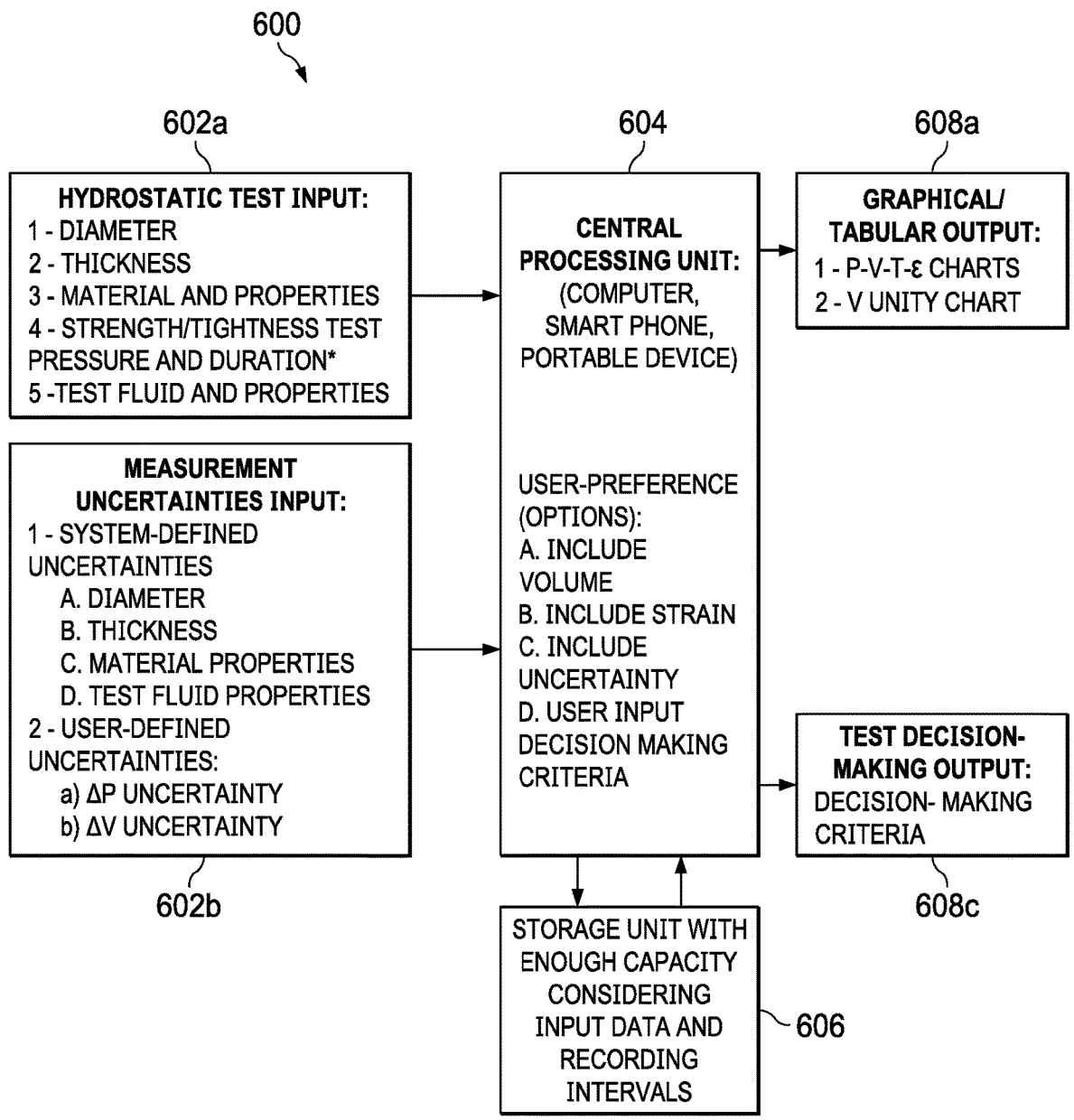

FIG. 6A is a system diagram of a computer system 600 for planning a test using the pipeline hydrostatic test system 300. The planning of the test aids in selecting measurement transducers and computer systems for performing the testing. The planning process accounts for uncertainty in the measurements and the effect of pressure, temperature, and volume on the predicted results. This aids in selecting the appropriate transducers in terms of accuracy and uncertainty for a desired test confidence range. Arrows denote the general flow of information within the computer system 600, but the information is configured to flow in both directions and is not limited to the directions indicated by the arrows.

Computer system 600 includes various inputs 602, a processor 604, a storage medium 606, and various outputs 608. Computer system 600 is substantially similar to computer system 400, except computer system 600 is designed to receive user-defined uncertainties including $(U_{\Delta P})_{desired}$ and $(U_{\Delta V, steel})_{desired}$ as input 602b to the computer system 400. $(U_{\Delta P})_{desired}$ is the desired uncertainty limit of the pressure measurement and $(U_{\Delta V, steel})_{desired}$ is the desired uncertainty limit of the volumetric measurement. Computer system 600 determines the uncertainties for particular measurement sensors as output 608b. The output uncertainties include an uncertainty limit for the pressure sensor, an uncertainty limit for the temperature sensor, an uncertainty limit for the volume sensor, and an uncertainty limit for the strain gauges. For example, an uncertainty limit for the temperature sensor might indicate an uncertainty limit of ±1° F. is necessary for the test to be performed in accordance with the test specifications. The outputs 408 provide a recommendation of appropriate data acquisition rates, storage medium requirements, and types of transducers, cameras, sensors, and/or strain gauges suggested for the strength and tightness test. This determination is based on user preferences, predicted signal levels, and an uncertainty preference.

Inputs 602a, 602b, and outputs 608a, 608c are substantially similar to computer system 400. The processor 604 is substantially similar to processor 404 except processor 604 is configured to perform a method for planning the strength and tightness test.

Figure 6B:
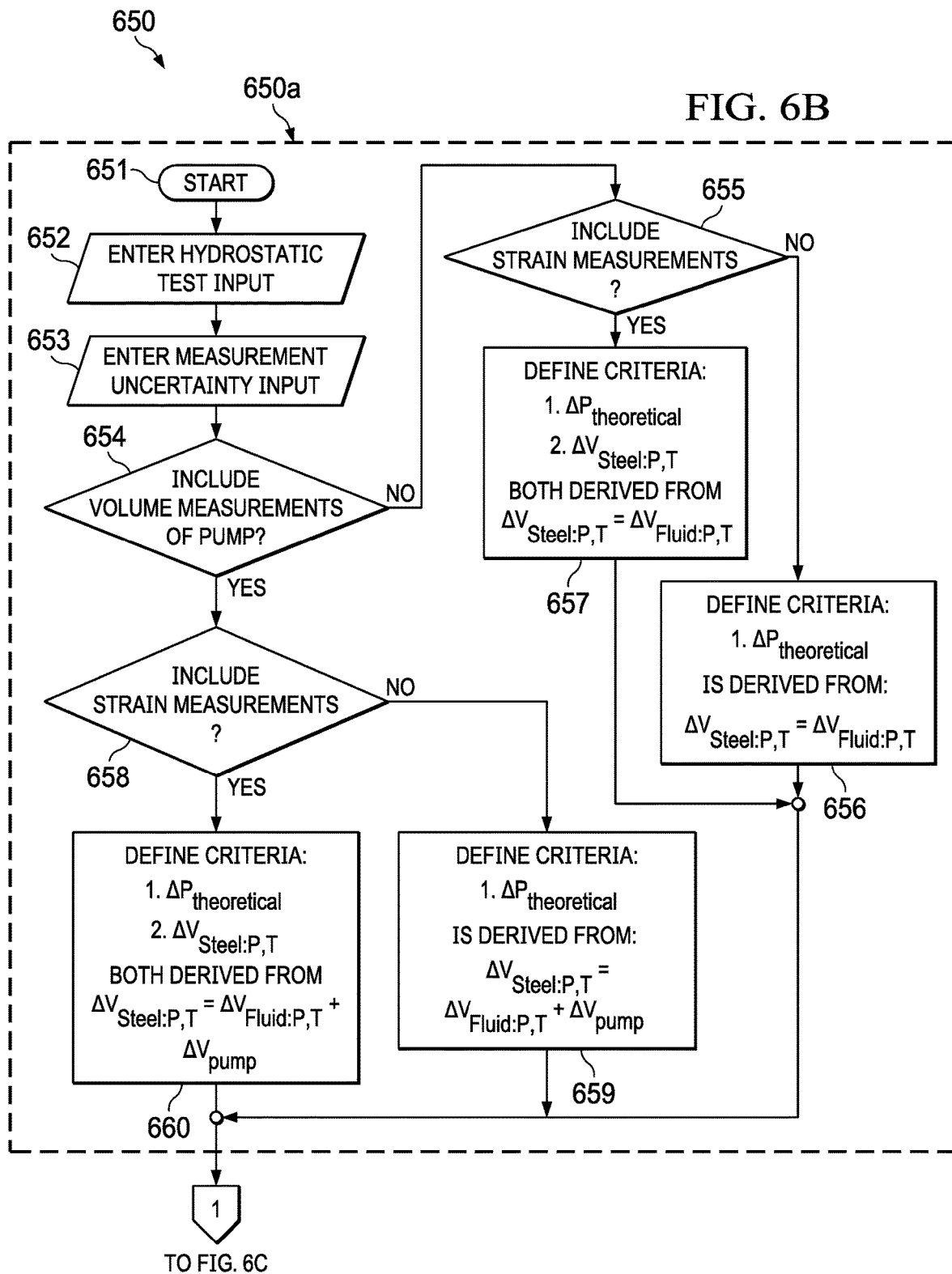

FIGS. 6B and 6C are a decision tree for a method 650 for planning a test using the pipeline hydrostatic test system 300. Method 650 is substantially similar to method 450 but the roles of the uncertainty analysis is reversed. Method 650 includes a criterion determination 650a method and an uncertainty determination 650b method. Method 650 is implemented in a computer software programming language such as Matlab or LabVIEW, but it is not limited to a specific software.

Method 650 starts (step 651) and includes receiving or defining hydrostatic test input (step 652) and receiving or defining measurement uncertainty input (step 653). These inputs are typically received or selected by a user but can also be determined by the computer. For example, in some cases, the inputs are determined by retrieving input information from data storage of a computer. In some cases, a desired change in pressure uncertainty, $U_{\Delta P}$, and a desired change in volume uncertainty, $\mu_{\Delta V}$, is specified.

Method 650 determines a theoretical change in pressure expected $\Delta P_{theoretical}$ and a volumetric change of the pipe section material $\Delta V_{Steel:P,T}$.

If method 650 determines that volume measurements of the test pump should not be included in the testing process (step 654) and that strain measurements should also not be included in the testing process (step 655), the method 650 determines $\Delta P_{theoretical}$ and $\Delta V_{Steel:P,T}$ using criteria (step 656) by considering that the volumetric expansion of the steel test pipe is equal to the volumetric expansion of the fluid within the test pipe $\Delta V_{Steel:P,T} = \Delta V_{Fluid:P,T}$ and $\Delta P_{theoretical}$ is determined from $\Delta V_{Steel:P,T} = \Delta V_{Fluid:P,T}$.

If method 650 determines that volume measurements of the test pump should not be included in the testing process (step 654), but that strain measurements should be included in the testing process (step 655), the method 650 determines $\Delta P_{theoretical}$ and $\Delta V_{Steel:P,T}$ using the criteria (step 657) by considering that the volumetric expansion of the steel test pipe is also equal to the volumetric expansion of the fluid within the test pipe $\Delta V_{Steel:P,T} = \Delta V_{Fluid:P,T}$, and $\Delta P_{theoretical}$ is determined from $\Delta V_{Steel:P,T} = \Delta V_{Fluid:P,T}$, $\Delta P_{theoretical}$ and $\Delta V_{Steel:P,T}$.

If method 650 determines that volume measurements of the test pump should be included in the testing process (step 654), but that strain measurements should not be included in the testing process (step 658), the method 650 determines $\Delta P_{theoretical}$ and $\Delta V_{Steel:P,T}$ using criteria (step 659) by accounting for the volumetric change of the system $\Delta V_{pump}$ and also accounting for the strain gauge data. In particular, $\Delta V_{Steel:P,T} = \Delta V_{Fluid:P,T} + \Delta V_{pump}$, where $\Delta V_{pump}$ is the change of volume measured by the pump.

If method 650 determines that volume measurements of the test pump should be included in the testing process (step 654) and that strain measurements should also be included in the testing process (step 658), the method 650 determines $\Delta P_{theoretical}$ and $\Delta V_{Steel:P,T}$ using criteria (step 660) by not accounting for the strain gauge data. Specifically, $\Delta V_{Steel:P,T} = \Delta V_{Fluid:P,T} + \Delta V_{pump}$ and $\Delta P_{theoretical}$ is derived from $\Delta V_{Steel:P,T}$.

Method 650 receives or determines the desired uncertainty limits (step 661): $(U_{\Delta P})_{desired}$ and $(U_{\Delta V,steel})_{desired}$ where $(U_{\Delta P})_{desired}$ is the desired uncertainty limit of the pressure measurement and $(U_{\Delta V,\ steel})_{desired}$ is the desired uncertainty limit of the volumetric measurement. Method 650 includes conducting an uncertainty analysis (step 662) to calculating the actual uncertainty limits (step 663): $U_{\Delta P}$ and $U_{\Delta V,\ steel}$ from the uncertainty analysis. In some cases, the uncertainty analysis is conducted using Moffat, R. J. "Contribution to the Theory of Single-Sample Uncertainty Analysis" Journal of Fluids Engineering. Vol. 104, 1982, pp 250-260.

The process determines whether the computed uncertainty is less than the desired uncertainty (step 664). This is performed by evaluating whether the following condition is satisfied:

$$U_{\Delta P} < (U_{\Delta P})_{desired} \text{ and } U_{\Delta V,steel} < (U_{\Delta V,steel})_{desired}. \tag{5}$$

If Eq. (5) is not satisfied, then the process recommends that the measurement uncertainty inputs are redefined (step 653). Upon updating $(U_{\Delta P})_{desired}$ and $(U_{\Delta V,\ steel})_{desired}$, method 650 conducts another uncertainty analysis (step 662) and the process repeats until the condition of Eq. (5) is satisfied.

For example, consider a case where a user-defined temperature uncertainty is ±0.1° F. (step 653) and the user indicates that the desired pressure uncertainty is ±5 psi (step 661). The method uses uncertainty calculations (step 662 and step 663) to determine the pressure uncertainty that corresponds to the ±0.1° F. temperature uncertainty. If the method outputs that the pressure uncertainty result is ±10 psi (decision step 664), the user should update the user-defined temperature uncertainty to a lower value. For example, if the user redefines the user-defined temperature uncertainty to ±0.05° F. (step 665) and the m determines the result of pressure uncertainty is ±1 psi, the program will terminate since this resulting pressure uncertainty is lower than the desired pressure uncertainty. Once Eq. (3) is satisfied, method 650 concludes (step 666) and output is routed to the outputs 608 as seen in FIG. 6A.

In some cases, the planning process described in FIGS. 6A and 6B is performed before the testing process described in FIGS. 4A-4C. In some cases, the testing process is performed before the planning process. For example, in some cases, an initial testing is performed to calibrate the planning process. In some cases, multiple planning processes are performed. For example, multiple predictions can be performed to assess a statistical variance in inputs. In some cases, multiple tests can be performed to generate a statistical average of results.

FIG. 7 is a schematic of a pipeline hydrostatic test system 700 according to a second embodiment. Test system 700 is substantially similar to test system 700, but uses a test manifold 750 instead multiple ports in the pipe section. The test manifold 750 consolidates the test equipment together so that a single port 708 in the pipe section 702 is used to perform the strength and tightness testing. As with test system 300, the pipe section 702 is isolated by a left valve 704 and a right valve 706. Instead of valves 704, 706, some pipe sections are isolated by blind flanges.

Test equipment and measurement devices are installed on the test manifold 750. Test manifold 750 includes a valve 710 that is configured to be opened to provide a fluid connection between the central pipe section 722 of the test manifold 750 and the pipe section 702. The valve 710 is a manual valve. In some cases, the valve 710 is a solenoid valve and computer controlled. A pump 714 is fluidly connected through a second valve 712 to a central pipe section 722 of the test manifold 750. The pump 714 is configured to pressurize and depressurize the pipe section 702. In some cases the pump is a reciprocating pump.

A pressure transducer 718 is fluidly connected through a third valve 716 to the central pipe section 722. The pressure transducer 718 is electrically connected to a data acquisition system of a computer and is configured to determine the pressure of the fluid within the test manifold 750. The pressure of the fluid within the test manifold 750 represents the pressure of the fluid within the pipe section 702. A thermocouple 720 is fluidly connected to the central pipe section 722. The thermocouple is electrically connected to a data acquisition system of a computer and is configured to determine the temperature of the fluid within the test manifold 750. The temperature of the fluid within the test manifold 750 represents the temperature of the fluid within the pipe section 702.

The test manifold 750 includes a pressure relief valve 728 that is fluidly connected to the central pipe section 722 via a valve 724. The pressure relief valve is configured to purge air or fluid from the test system if the pressure exceeds a threshold. The test manifold 750 includes a volume measurement and recording system 726 that is fluidly connected to the central pipe section 722 of the test manifold 750. The volume measurement and recording system 726 is electrically connected to a data acquisition system of a computer and is configured to measure and record the volume of fluid that is purged from the pipe section 302 by the pressure relief valve 728.

The pipe section 702 includes strain gauges 730 that are substantially similar to the axial strain gauge 316a and the circumferential strain gauge 316b of test system 300. The strain gauges 730 are located on the outer surface of the pipe section 702. The strain gauges 730 are electrically connected to a data acquisition system of a computer for strain gauge measuring and recording.

Figure 8:
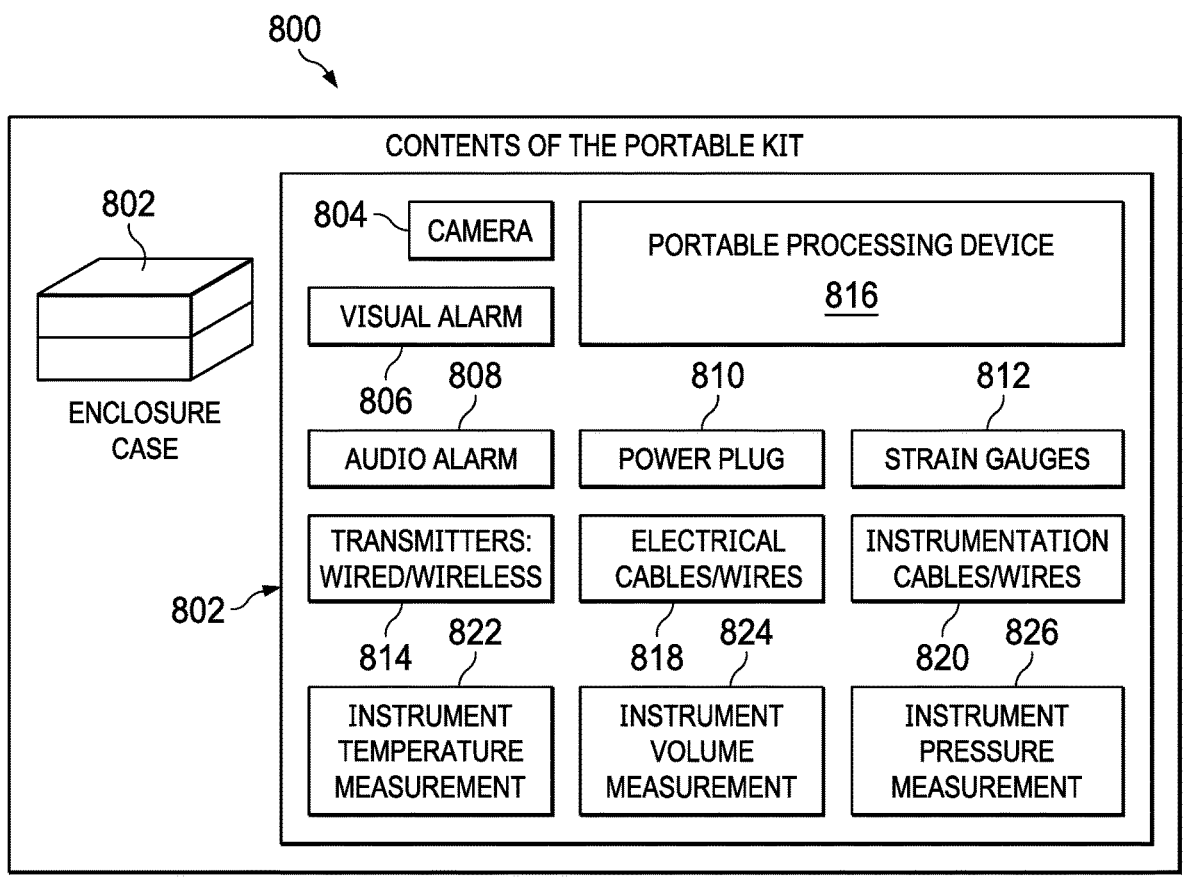
FIG. 8 is a diagram of a pipeline test system packaged into a portable test kit.

FIG. 8 is a system diagram of a portable kit 800 configured to perform the planning and testing phases of the test system 300 or the test system 700. Portable kit 800 includes an enclosure case 802 that includes the necessary measurement instruments and a pre-configured processing device 816. The processing device 816 is a portable computer that executes the computational tasks of the method and notifies a user whether a pipe section under test has passed or failed the testing. The processing device 816 includes a data storage medium with capabilities to receive signals (wired and/or wireless, and cloud connectivity), process and store data, and display/transfer output on its own display screen or transfer output through wired/wireless or cloud connectivity. In some cases, the processing device 816 controls the entire testing process, such as the pump and the solenoid valves of the test system. In some cases, the processing device 816 is pre-configured with the appropriate uncertainty data for the sensors/instruments included in the portable kit 800 and sometimes the user can define or adjust these uncertainty values and/or modify the accuracy/tolerance of the method.

The portable kit 800 includes one or more cameras 804, a visual alarm 806, and audible alarm 808. The cameras 804 are mounted on the test system and configured for live video streaming of the instrument readings, and/or expected points of leaks. In some cases, the cameras 804 live stream video of the test manifold valves and fluid connections. In some cases, the cameras 804 live stream video of the pressure readings, the volume readings, and the temperature readings. The visual alarm 806 and audible alarm 808 form an alert system that is configured to alert a user if a pre-defined threshold of the test has been exceeded. In some cases, an audible warning 808 is activated by the processing device 816 when the pressure is 90% of the test pressure. In some cases, an audible danger alert 808 is activated by the processing device 816 when the processing device 816 determines that failure of the pipe section is imminent such as when the pipe section reaches the yielding limit of the pipe section material.

The portable kit 800 includes the appropriate power cables 810 for the electrical devices. The portable kit 800 includes multiple strain gauges 812, such as the axial and circumferential strain gauges previously described. The portable kit 800 includes wires and/or wireless transmitters 814. The wireless transmitters 814 are used to transmit data from the portable kit 800 when used in a wireless configuration. The portable kit 800 includes the appropriate electrical cables and wires 818 and instrumentation cables and wires 820 to electrically connect the instruments to the processing device 816.

The portable kit 800 includes a temperature measurement instrument 822 in the form of a thermocouple. The portable kit 800 includes a volume measurement instrument 824 in the form of a volume sensor. The portable kit 800 includes a pressure measurement instrument 826 in the form of a pressure sensor.

While the test systems 300, 600 and the portable kit 800 are described in references to a single pipe section, in some cases, multiple test sections are analyzed. In this case, instruments are installed for each pipe section. This is to test various pipe sections to better represent different diameters, different thicknesses, different elevations, and buried vs. above-ground sections.

While test systems 300, 600 and the portable kit 800 are described with various measurement sensors, some test systems do not include a temperature, volume, or strain measurement. Instead, some tests include only a pressure measurement using a single pressure gauge.

Figure 9:
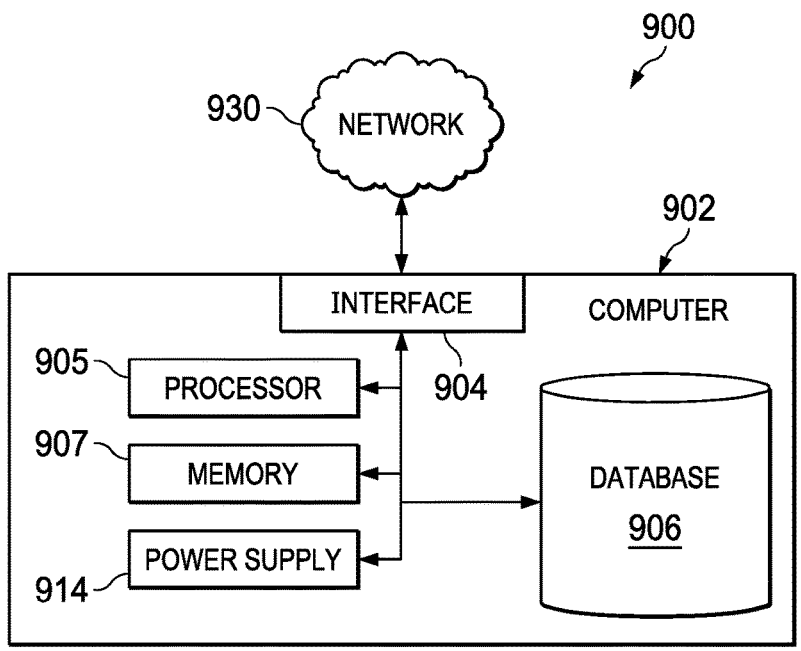
FIG. 9 is a block diagram of a computer system.

FIG. 9 is a block diagram of an example computer system 900 that can be used to provide computational functionalities associated with described algorithms, methods, functions, processes, flows, and procedures described in the present disclosure, according to some implementations of the present disclosure. In some embodiments, the computer system 900 performs the numerical simulation of the liner and displays the results on a display. In some embodiments, the computer system 900 receives user input and stores data representing the numerical simulation results.

The illustrated computer 902 is intended to encompass any computing device such as a server, a desktop computer, an embedded computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI). In some embodiments, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 902 can include a Smart Embedded Management Agent (SEMA), such as a built-in ADLINK SEMA 2.2, and a video sync technology, such as Quick Sync Video technology supported by ADLINK MSDK+. In some examples, the computer 902 can include the MXE-5400 Series processor-based fanless embedded computer by ADLINK, though the computer 902 can take other forms or include other components.

The computer 902 can serve in a role as a client, a network component, a server, a database, a persistency, or components of a computer system for performing the subject matter described in the present disclosure. The illustrated computer 902 is communicably coupled with a network 930. In some embodiments, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some embodiments, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus. In some implementations, any or all of the components of the computer 902, including hardware or software components, can interface with each other or the interface 1004 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 902 and other components (whether illustrated or not) that are communicably coupled to the computer 902. The functionality of the computer 902 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 902, in alternative implementations, the API or the service layer can be stand-alone components in relation to other components of the computer 902 and other components communicably coupled to the computer 902. Moreover, any or all parts of the API or the service layer can be implemented as child or sub-modules of another software module, enterprise application, or hardware module without departing from the scope of the present disclosure.

The computer 902 can include an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 can also include a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

An application can be an algorithmic software engine providing functionality according to particular needs, desires, or particular implementations of the computer 902 and the described functionality. For example, an application can serve as one or more components, modules, or applications. Multiple applications can be implemented on the computer 902. Each application can be internal or external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system including computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, Linux, Unix, Windows, Mac OS, Android, or iOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

A number of embodiments of the systems and methods have been described. Nevertheless, it will be understood that various modifications may be made without departing from the spirit and scope of this disclosure. Accordingly, other embodiments are within the scope of the following claims.

What is claimed is:

1. A method for performing a pressure test of a pipe section of a pipeline, the method comprising:
receiving, at a processor, a desired pressure to be applied to an inner surface of the pipe section and a duration of time that the desired pressure is to be applied to the pipe section;
receiving, at the processor, a pressure measurement of a fluid, a temperature measurement of the fluid, a volume measurement of the fluid, and a strain measurement of the pipe section;
determining, by the processor, a change in pressure of the fluid of the pipe section and a change in volume of the fluid of the pipe section;
determining, by the processor, when the change in pressure is different from a theoretical change in pressure;
determining, by the processor, a pressure change uncertainty and a volume change uncertainty;
checking, by the processor, that the pressure change uncertainty is within a pressure uncertainty threshold and that the volume change uncertainty is within a volume uncertainty threshold;
determining, by the processor, whether the desired pressure has been applied to the inner surface of the pipe section for the duration of time; and
outputting a result of the testing, the pressure change uncertainty, and the volume change uncertainty.

2. The method of claim 1, wherein determining the pressure change uncertainty and the volume change uncertainty is based, at least in part, on a pressure sensor uncertainty of a pressure sensor measuring the pressure of the fluid.

3. The method of claim 2, wherein determining the pressure change uncertainty and the volume change uncertainty is based, at least in part, on a temperature sensor uncertainty of a temperature sensor measuring the temperature of the fluid.

4. The method of claim 1, wherein determining the pressure change uncertainty and the volume change uncertainty is based, at least in part, on a strain gauge sensor uncertainty of a strain gauge sensor measuring the strain of the pipe section.

5. The method of claim 4, wherein the strain measurement is measured using:

an axial strain gauge located on an outer surface of the pipe section, oriented axially along the pipe section, and configured to measure an axial strain; and a circumferential strain gauge located on the outer surface of the pipe section, oriented circumferentially along the pipe section, and configured to measure a circumferential strain.

6. The method of claim 1, further comprising determining whether the desired pressure has been applied to the inner surface of the pipe section for the duration of time while the pressure change uncertainty is within the pressure uncertainty threshold and the volume change uncertainty is within the volume uncertainty threshold.

7. The method of claim 1, further comprising receiving information representing an uncertainty associated with each of the pressure measurement of the fluid, the temperature measurement of the fluid, the volume of the fluid, and the strain measurement of the pipe section.

8. The method of claim 1, further comprising receiving geometric properties of the pipe section, the geometric properties comprising a diameter of the pipe section and a thickness of the pipe section, wherein the pressure change uncertainty and the volume change uncertainty are based on the geometric properties of the pipe section.

9. The method of claim 8, further comprising receiving material properties of the pipe section, the material properties comprising a thermal expansion of the pipe section and a yield strength of the pipe section, wherein the pressure change uncertainty and the volume change uncertainty are based on the material properties of the pipe section.

10. The method of claim 9, further comprising determining when material yielding occurs in the pipe section based on, at least in part, the pressure measurement and the volume measurement.

11. The method of claim 1, further comprising activating a notification based on the determination that the change is pressure is different from the theoretical change in pressure.

12. The method of claim 11, wherein activating the notification is further based on the determination that the change is pressure is different from the theoretical change in pressure.

13. The method of claim 1, further comprising determining when the change is volume is different from a theoretical change in volume.

14. The method of claim 1, further comprising activating a notification when the pressure change uncertainty is not within the pressure uncertainty threshold and the volume change uncertainty is not within the volume uncertainty threshold.

15. The method of claim 1, further comprising applying the desired pressure to the pipe section by pumping fluid into the pipe section.

16. A system for performing a pressure test of a pipe section of a pipeline, the system comprising:

a pressure sensor configured to measure a pressure of a fluid within the pipe section;

a temperature sensor configured to measure a temperature of the fluid within the pipe section;

a volume sensor configured to measure a volume of the fluid within the pipe section based, at least in part, on a thermal coefficient of expansion of the pipe section;

one or more strain gauges configured to measure a strain of the pipe section; and a computer comprising a processor and a storage medium, the computer configured to:

receive the pressure measurement from the pressure sensor, the temperature measurement from the sensor, the volume measurement from the volume sensor, and the strain measurement from the one or more strain gauges; and determine whether the pipe section passes a strength test and whether the pipe section passes a tightness test by accounting for an uncertainty associated with the pressure sensor, the temperature sensor, the volume sensor, and the one or more strain gauges.

17. The system of claim 16, wherein the one or more strain gauges comprise:

an axial strain gauge located on an outer surface of the pipe section, oriented axially along the pipe section, and configured to measure an axial strain; and, a circumferential strain gauge located on the outer surface of the pipe section, oriented circumferentially along the pipe section, and configured to measure a circumferential strain.

18. The system of claim 16, wherein the computer is further configured to determine a pressure change uncertainty of the pipe section and a volume change uncertainty of the fluid within the pipe section.

* * * * *